United States Patent
Bates et al.

(10) Patent No.: US 9,165,360 B1
(45) Date of Patent: Oct. 20, 2015

(54) METHODS, SYSTEMS, AND DEVICES FOR AUTOMATED ANALYSIS OF MEDICAL SCANS

(71) Applicants: Douglas Bates, La Jolla, CA (US); Nathan S. White, San Diego, CA (US)

(72) Inventors: Douglas Bates, La Jolla, CA (US); Nathan S. White, San Diego, CA (US)

(73) Assignee: ZEPMED, LLC, San Diego, CA (US)

( * ) Notice: Subject to any disclaimer, the term of this patent is extended or adjusted under 35 U.S.C. 154(b) by 19 days.

(21) Appl. No.: 14/038,511

(22) Filed: Sep. 26, 2013

Related U.S. Application Data

(60) Provisional application No. 61/706,679, filed on Sep. 27, 2012.

(51) Int. Cl.
*G06T 7/00* (2006.01)

(52) U.S. Cl.
CPC ..... *G06T 7/0014* (2013.01); *G06T 2207/10081* (2013.01); *G06T 2207/20128* (2013.01)

(58) Field of Classification Search
CPC ........... G06T 2207/30016; G06T 2207/10072; G06T 7/0081; G06T 2207/10081; G06T 2207/20128; G06T 7/0024; G06T 3/0068; G06T 7/0038
See application file for complete search history.

(56) References Cited

U.S. PATENT DOCUMENTS

| | | | |
|---|---|---|---|
| 6,740,883 B1 * | 5/2004 | Stodilka et al. | 250/363.04 |
| 2014/0247977 A1 * | 9/2014 | Han | 382/159 |
| 2015/0086096 A1 * | 3/2015 | Liu et al. | 382/131 |

* cited by examiner

*Primary Examiner* — Amir Alavi
*Assistant Examiner* — Kenny Cese
(74) *Attorney, Agent, or Firm* — Knobbe, Martens, Olson & Bear, LLP

(57) ABSTRACT

The disclosure herein provides methods, systems, and devices for automated reorientation and/or analysis of medical scans and/or images. The methods, systems, and devices for automated analysis of medical scans can be configured to mark, score, grade, and/other otherwise classify medical scans that are more time-sensitive, severe, and/or the like to allow a medical professional reviewing and/or analyzing medical scans to view and/or analyze such scans more efficiently by using a common image orientation and/or taking into account knowledge of the risk of severity, time-sensitiveness, and/or other priority.

38 Claims, 27 Drawing Sheets

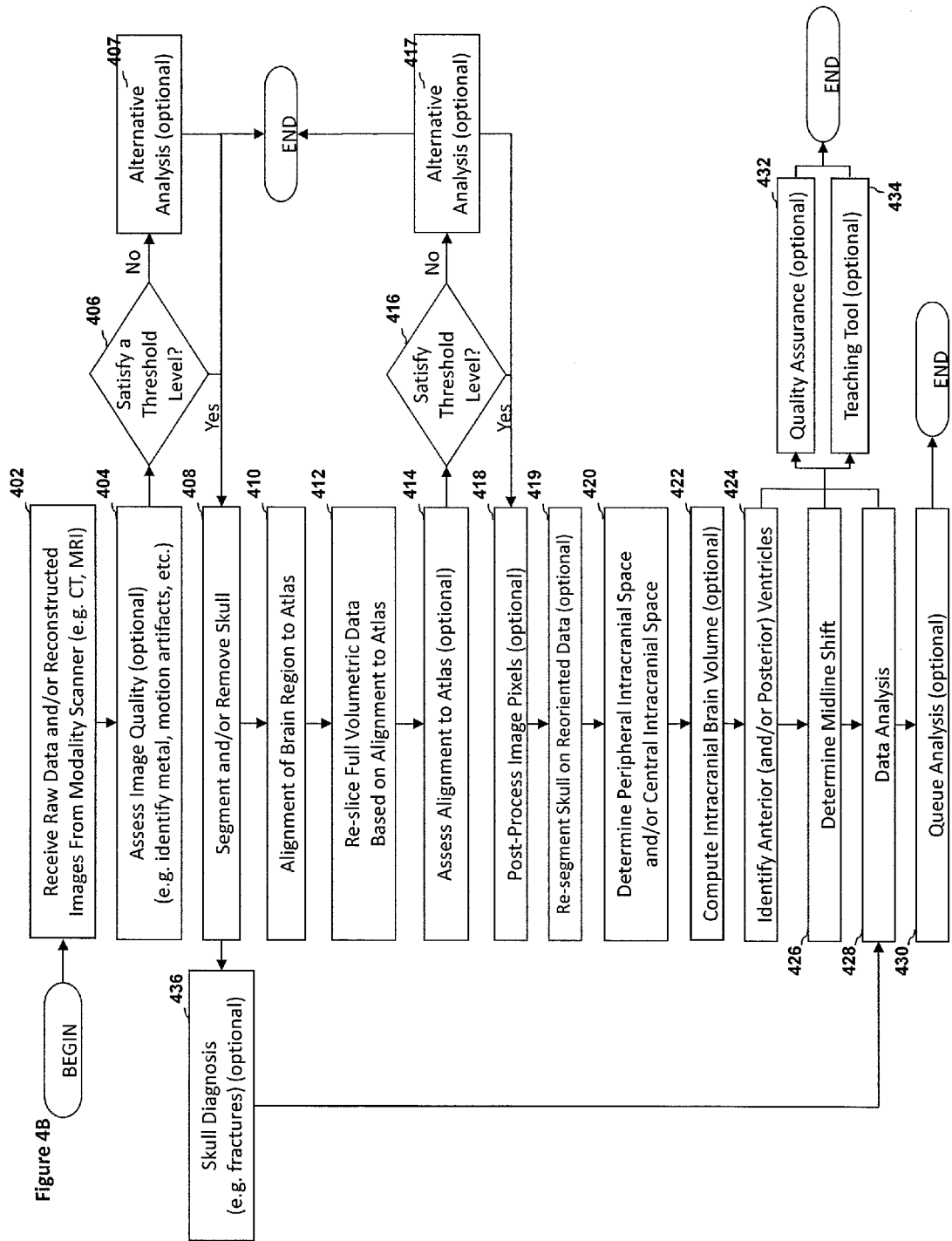

Skull Segmentation

Labeled Data Set of Skull

Atlas Development

Alignment to Atlas &
Re-slicing Data Set

Aligned and Resampled CT Volume
(Reconstructed Density (Hounsfield) Image)

Determine Peripheral Intracranial Space

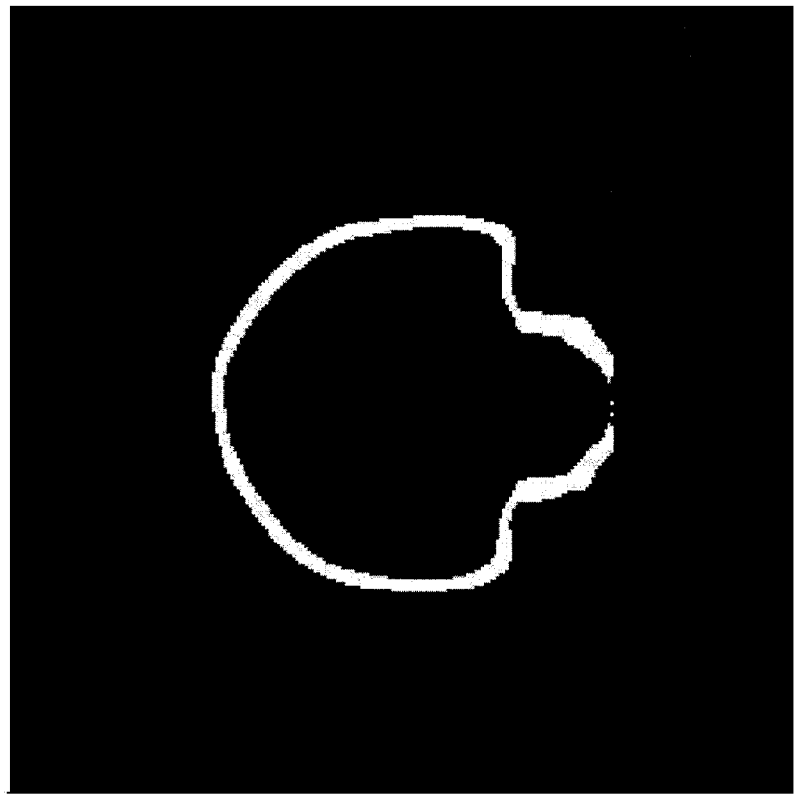
Figure 8A  Labeled Data Set of Peripheral Intracranial Space

Labeled Data Set of
Central Intracranial Space

Compute and Compare Brain Volume

Identify Ventricles

Ventricular Analysis

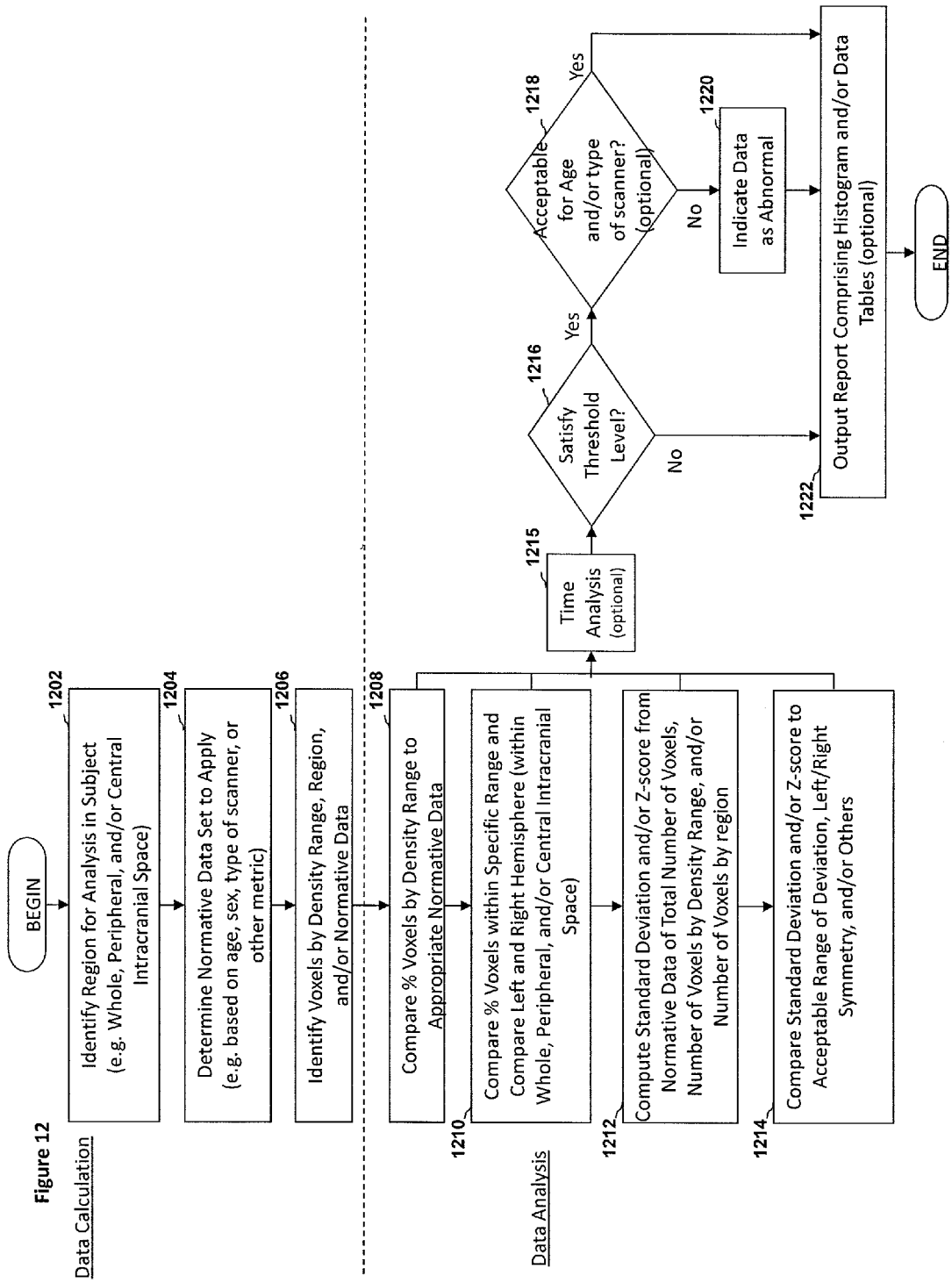

Queue Analysis

Queue Analysis

Queue Analysis

Quality Assurance
and/or Teaching Tool

| Midline Shift: | | Severity Score: | |
|---|---|---|---|
| Shift (mm): | -1.242 | Patient ID: | xxxxxx |
| Accuracy [0 1]: | 0.966 | Patient Age: | xx |
| Asymmetry: | 1.000 | Overall Score: | x |

Figure 17A

| Midline Shift: | | Severity Score: | |
|---|---|---|---|
| Shift (mm): | 10.782 | Patient ID: | xxxxxx |
| Accuracy [0 1]: | 0.901 | Patient Age: | xx |
| Asymmetry: | 1.500 | Overall Score: | x |

Figure 17B

METHODS, SYSTEMS, AND DEVICES FOR AUTOMATED ANALYSIS OF MEDICAL SCANS

CROSS-REFERENCE TO RELATED APPLICATIONS

The present application claims the benefit under 35 U.S.C. 119(c) to U.S. Provisional Application No. 61/706,679, filed Sep. 27, 2012, and titled METHODS, SYSTEMS, AND DEVICES FOR AUTOMATED ANALYSIS OF MEDICAL SCANS, which is hereby incorporated herein by reference in its entirety, including specifically but not limited to the systems and methods relating to automated analysis of medical scans.

BACKGROUND

1. Field

This disclosure relates generally to the field of medical imaging, and more specifically to a system for automated analysis of medical images and scans.

2. Description

With the development of medical scanning and imaging technologies, a growing number of medical professionals and medical facilities utilize medical scanning and imaging techniques for review and diagnosis. In general these scans and images can be placed in a queue to be reviewed and analyzed by a medical professional. Naturally, some medical scans are relatively more time-sensitive and can require more immediate review and attention by a medical professional than other scans. With the growing number of medical scans, however, it is difficult to ascertain which medical scans require more immediate attention than others. Accordingly, it can be advantageous to provide a system that effectively and efficiently conducts an automated review and/or analysis of one or more medical scans in order to allow a medical professional to review those medical scans that are relatively more time-sensitive and/or severe before reviewing others.

SUMMARY

Advancements in medical scanning and imaging technologies make it possible to efficiently analyze one or more medical scans within a short period of time for an automated review and/or analysis.

In some embodiments, a computed axial tomography scan analysis system comprises: an acquisition module configured to access from an electronic database computed axial tomography data of a head region of a patient, the computed axial tomography data comprising a volumetric data set of the head region; a skull segmentation module configured to identify a first data set corresponding to a skull region in the volumetric data set and a second data set corresponding to a brain matter region in the volumetric data set; an atlas alignment module configured to utilize the second data set to align the volumetric data set to a normative data set, the aligning configured to position the head region to a predetermined position; a ventricle identification module configured to identify the anterior and posterior ventricles regions of the patient in the second data set of the aligned volumetric data set; a midline shift detection module configured to analyze the anterior and posterior ventricles regions to determine a shift in the midline of the ventricles of the patient; an analysis module configured to analyze the second data set to determine whether detected tissue type amounts correspond to the normative data set; and a queue management system configured to position the patient in a workflow listing comprising a plurality of other patients based on the determination of the analysis module and on the shift in the midline of the ventricles, where the system comprises a computer processor and electronic storage medium.

In certain embodiments, a computed axial tomography scan normalization system comprises: an acquisition module configured to access from an electronic database computed axial tomography data of a head region of a patient, the computed axial tomography data comprising a volumetric data set of the head region. In an embodiment, the system can optionally comprise a skull segmentation module configured to identify a skull region in the volumetric data set and a brain matter region in the volumetric data set. The system can comprise an atlas alignment module configured to access from an atlas database a normative data set based on a computed axial tomography scanner type; and a registration module configured to apply an image registration algorithm to align the volumetric data set to the normative data set to generate an aligned volumetric data set. In an embodiment, the system can optionally comprise a reslicing module configured to reslice the aligned volumetric data set to generate a normalized volumetric data set; and an output module configured to output the normalized volumetric data set. In an embodiment, the system comprises a computer processor and electronic storage medium.

In some embodiments, a computed axial tomography scan analysis system comprises: an acquisition module configured to access from an electronic database computed axial tomography data of a head region of a patient, the computed axial tomography data comprising a volumetric data set of the head region; a skull segmentation module configured to identify a first set of data elements in the volumetric data set that correspond to the skull portion of the patient and a second set of data elements in the volumetric data set that correspond to other brain matter of the patient; an atlas alignment module configured to utilize the second set of data elements to align the volumetric data set to a normative data set, the aligning configured to position the head region to a predetermined position; a reslicing module configured to reslice the aligned volumetric data set; an intracranial periphery boundary module configured to identify a third set of data elements in the second set of data elements that correspond to an intracranial periphery area and fourth set of data elements that correspond to brain matter within the intracranial periphery area; a ventricle identification module configured to identify a fifth set of data element in the fourth set of data that correspond to anterior and posterior ventricles of the patient; a midline shift detection module configured to utilize the fifth set of data elements to determine a shift in the midline of the ventricles of the patient; a tissue detection module configured to utilize the fourth set of data elements to determine a tissue type for each data element in the fourth set of data elements; an analysis module configured to determine whether detected tissue type amounts correspond to the normative data set; and a priority assessment system configured generate a priority output based on the determination of the analysis module and on the shift in the midline of the ventricles; a queue management system configured to position the patient in a workflow listing comprising a plurality of other patients based on the priority output, where the system comprises a computer processor and electronic storage medium. In some embodiments, the priority output in the computed axial tomography scan analysis system is a score. In some embodiments, the priority output in the computed axial tomography scan analysis system is a flag. In some embodiments, the skull segmentation module of the computed axial tomography scan analysis system is further configured to generate skull mapping by identifying data elements in the volumetric data set that correspond to the skull portion of the patient and labeling the identified data elements with a first label and labeling all other data elements with a second label.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIG. 4B is a process flow diagram illustrating an example of an embodiment of automated analysis of medical scans.

FIG. 8A depicts an example illustrating a labeled data set of peripheral intracranial space.

FIG. 12 is a process flow diagram illustrating an example of an embodiment of calculating and analyzing scanned subject data.

FIGS. 16A-16B depict examples illustrating data charts of healthy and unhealthy subjects.

FIGS. 17A-17B depict examples illustrating data charts of healthy and unhealthy subjects.

DETAILED DESCRIPTION

Figure 1A:
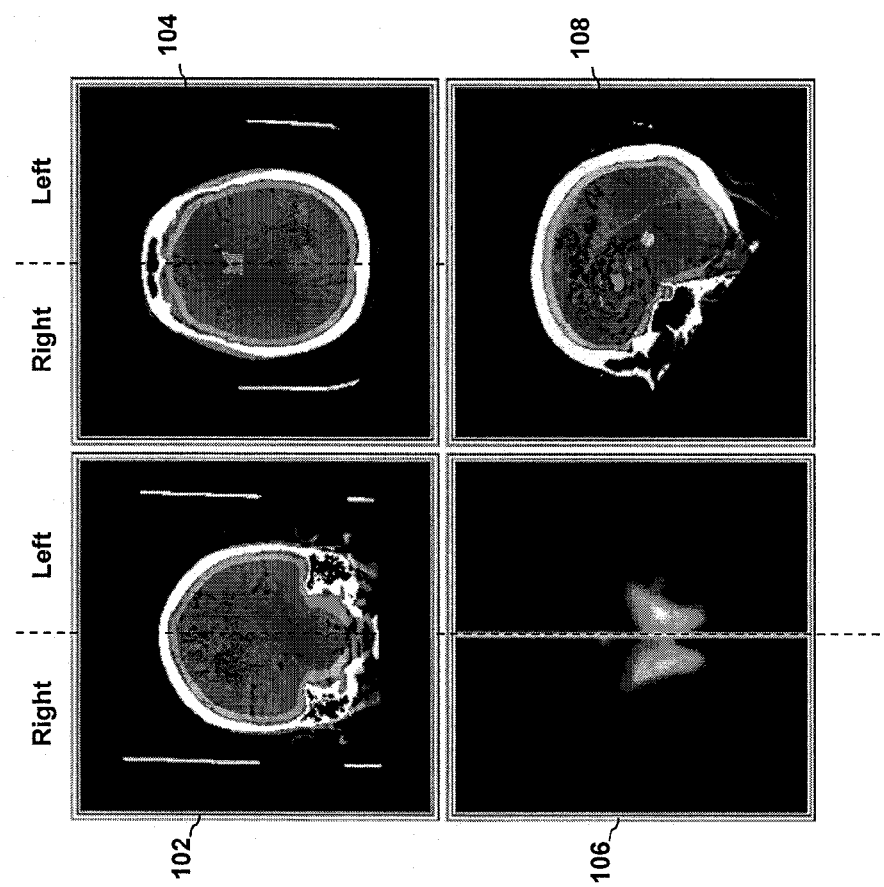
FIG. 1A depicts an example illustrating a medical scan of a head region of a healthy subject.

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

The disclosure herein provides methods, systems, and devices for automated analysis of medical scans and/or images.

As used herein, the terms "medical scan," "scan," "medical image," and "image," "scanned image," "subject data," "scanned subject data," and "scanned data," are broad interchangeable terms, and comprise without limitation images and/or scans obtained from a computed tomography (CT) scan, computed axial tomography (CAT) scan, X-ray scan, magnetic resonance imaging (MRI) scan, and other imaging and/or scanning techniques for medical or biomedical purposes that are currently existing or to be developed in the future, and/or combinations thereof.

The embodiments disclosed herein may be applied to either pixels or voxels. For example, certain embodiments may refer to the analysis of voxels; however, it should be understood to one of ordinary skill in the art that the underlying concepts disclosed herein can be applied to either pixels or voxels.

With the development of medical imaging technology, more and more patients and medical professionals use various types of medical imaging systems for diagnosis and for other purposes. For example, such medical imaging systems can include CT scan, CAT scan, X-ray scan, MRI scan, ultrasonic scan and other modality scanners. As the volume of such scans and scan data of patients increases, it can be difficult to organize and/or facilitate the review of such medical scans. One method of reviewing a plurality of medical scans is to simply review scans on a first-come first-serve basis.

For example, generally radiologists are on-call to review radiology films as they are produced by one or more modality scanners at a medical facility. As medical films are produced by a scanner, they are inputted into a workflow listing or other queue for the radiologist to review. Generally, the films are entered into the workflow list in the order they are produced or received by the radiologist, with the most recently created films being placed at the end of the queue.

However, with such reviewing schemes, it is not possible to give priority to those patients with relatively more severe conditions and/or time sensitive conditions. For example, a patient with an acute intracranial hemorrhage will generally be placed at the end of a queue for a radiologist to review rather than being positioned at the top of a workflow list for immediate review by the radiologist. If the film showing a severe patient condition can be reviewed more quickly, the patient can be treated more quickly, which can improve the overall care received by the patient.

Accordingly, it can be advantageous to generate and implement a triage and/or diagnosis system for allowing a medical professional reviewing and/or analyzing medical scans in an order of severity, time sensitiveness, or other priority. For example, such a system can be configured to position high priority cases on a workflow list ahead of lower priority patient cases, thereby allowing the radiologist or other medical professional to review the high priority cases first before reviewing any other case. Further, it can be advantageous to generate and implement a reorientation system by using a common image orientation scheme for a plurality of medical scans. The reorientation can be performed as a standalone function of the system with or without performing one or more analyses of the medical scan, for example, triage analysis and/or diagnosis.

The system can be especially advantageous for third party facilities that provide outsourced radiology interpretation/analysis, teleradiology services, and/or other medical services, such as StatRad™ or the like. For example, when such third party service providers receive a new medical scan for analysis and review, the third party service provider can utilize the systems disclosed herein to analyze the medical scan in order to determine the priority of the case, the position of the case in a workflow queue, and/or physician and/or medical facility for reviewing the medical scan.

The system can also be useful within a hospital or outpatient facility when a radiologist is not necessarily reviewing scans contemporaneously, which can occur if one is covering several facilities or scanners at once, also performing procedures or when 'batch reading' of scans is done. In such an implementation, the system may be used to notify a physician of the likelihood of an acute finding by flagging the case on a PACS system or directly notifying a physician or other healthcare staff by page, text message, or other electronic communication.

In order to determine the severity and/or time sensitive characteristics of a plurality of medical scans, it is possible for a medical professional to initially review the plurality of medical scans and list them in an order of severity and/or time sensitive characteristics. However, such a process is expensive, subjective rather than objective, and cannot be completed in a timely fashion, especially in situations where there are hundreds or thousands of patient cases to review and analyze on a continuous basis. As such, a process by which a medical professional conducts an initial review for determining a queue priority is not economical and/or feasible, especially in high volume situations when there are thousands of medical scans to review, wherein each scan comprises several megabytes of volumetric data. For example, a single scan of a head region of a patient can comprise anywhere between 25 to more than 200 megabytes.

Accordingly, there is a need for fast and efficient systems, methods, and devices for performing an automatic review and/or analysis to classify, reorient, conduct a triage, diagnose, and/or separate out those medical scans that have a greater need for a timely review by a medical professional for diagnosis. The methods, systems, and devices for automated reorientation and/or analysis of medical scans as illustrated herein can provide an effective solution to such a problem by marking, scoring, grading, and/or otherwise classifying those medical scans with a greater need for timely review and/or diagnosis by a medical professional. In certain embodiments, the systems, methods, and devices disclosed herein can be configured to review, reorient, and/or analyze, in real time and/or substantially in real time, thousands of medical scans on a continuous or batch basis, wherein each medical scan can comprise anywhere between 25 to more than 200 megabytes of volumetric data.

In some embodiments, medical scans that are identified as potentially severe cases can be flagged and/or graded in a way that allows medical professionals to choose to review and/or study such medical scans first. In other embodiments, such medical scans that have been identified as potentially severe can be actually moved up electronically in an electronic queue or electronic workflow list such that the medical professionals can automatically receive and can review such scans first.

In some embodiments, the methods, systems, and devices for automated reorientation and/or analysis of medical scans as described herein do not attempt to conduct an actual diagnosis, but rather the methods, systems, and devices only conduct a preliminary analysis or triage. In some embodiments, the methods, systems, and devices simply conduct an automated preliminary review and/or analysis of the medical files to ensure that those with a high probability of being severely abnormal are not sitting at the bottom of a stack of medical scans. In other embodiments, the methods, systems, and devices for automated reorientation and/or analysis of medical scans as described herein can be configured to conduct one or more diagnoses of medical scans.

In some embodiments, the methods, systems and devices as described herein are configured to conduct an initial review of a single medical scan in a timeframe of several minutes, about one minute, or less than one minute. As such, some embodiments do not substantially increase the total time for reviewing a plurality of medical scans, while effectively streamlining the complete review process such that the potentially more severe medical scans are reviewed first and the healthy or less severe medical scans are reviewed later.

In order to conduct an efficient and effective review of medical scans, in some embodiments, the system comprises one or more predetermined threshold values and/or ranges of voxel densities or intensities corresponding to a particular tissue or region of a subject patient. Such predetermined threshold values and/or ranges can be utilized by the system to efficiently and effectively determine whether a particular voxel of scanned subject data corresponds to a particular tissue and/or region.

For example, in certain embodiments, the system can be configured to correlate voxels of a CT scan of a head region of a subject patient with intensities between 5 and 15 Hounsfield Units to spinal fluid, voxels with intensities between 40 to 80 or 40 to 100 Hounsfield Units to hemorrhage, voxels with intensities above 100 Hounsfield units as skull or bone, voxels with intensities below −84 as air, voxels with intensities between −84 and −10 Hounsfield Units as fat, voxels with intensities between −10 and 15 Hounsfield Units as cerebral spinal fluid, or the like. In certain embodiments, the system can be configured to utilize such predetermined values and/or ranges of voxel intensity to quantify different portions a region of a patient, such as the brain region, edema, spinal fluid, and blood or the like.

In some embodiments, through an iterative process, the range of values corresponding to each of the components may be varied based upon the scanner manufacturer, the model number, the method of scan acquisition, the reconstruction algorithm, the use of IV or other contrast agents, or other factors.

Although the discussions herein generally describe application of the systems, methods, and devices for automated reorientation and/or analysis of medical scans in connection with scans of a head or brain region of a patient, the same systems, methods, and devices can be applied to conduct an automated reorientation and/or analysis of medical scans of other body regions and tissues as well. The reorientation can be performed as a standalone function of the system with or without performing one or more analyses of the medical scan, for example, triage analysis and/or diagnosis. For example, embodiments of the systems, methods, and devices for automated reorientation and/or analysis of medical scans as described herein can be applied to conduct an analysis of a scan of the intra-abdominal area or the like.

FIG. 1A depicts an example illustrating a medical scan of a head region of a healthy subject or patient. As shown in the coronal plain view 102 of the entire head portion, the medical scan of FIG. 1A does not show any abnormalities. Further, as shown in the transverse or axial plain view 104 of the entire head region, the anterior and posterior ventricles appear to be substantially located in the center of the brain. A sagittal plain view 108 of the entire head region similarly does not show any abnormalities. In addition, a projected two-dimensional view in the coronal plane of the ventricles 106 illustrates that the left and right portions of the ventricles are substantially similar in size and/or shape and are substantially symmetrical. Further, the midline of the ventricles is located substantially in the center of the brain region and has not substantially shifted to either the left or right direction.

As such, the medical scan of a patient as illustrated in FIG. 1A does not show any severe abnormalities or any particular need for an immediate review and/or diagnosis by a medical professional. Accordingly, in some embodiments, the system is configured to identify one or more of the aforementioned parameters and determine that this particular medical scan does not comprise a need for an immediate review. Accordingly, the system can be configured to maintain the position of the medical scan case in the queue, actively lowering the position of the medical scan case in the queue, and/or not affect the normal queue process for positioning the medical scan case in the queue. In certain embodiments, the system can be configured to label the particular medical scan as not requiring immediate attention and/or not label the particular medical scan at all, such that a medical professional does not give the medical scan any substantial priority in reviewing.

Figure 1B:
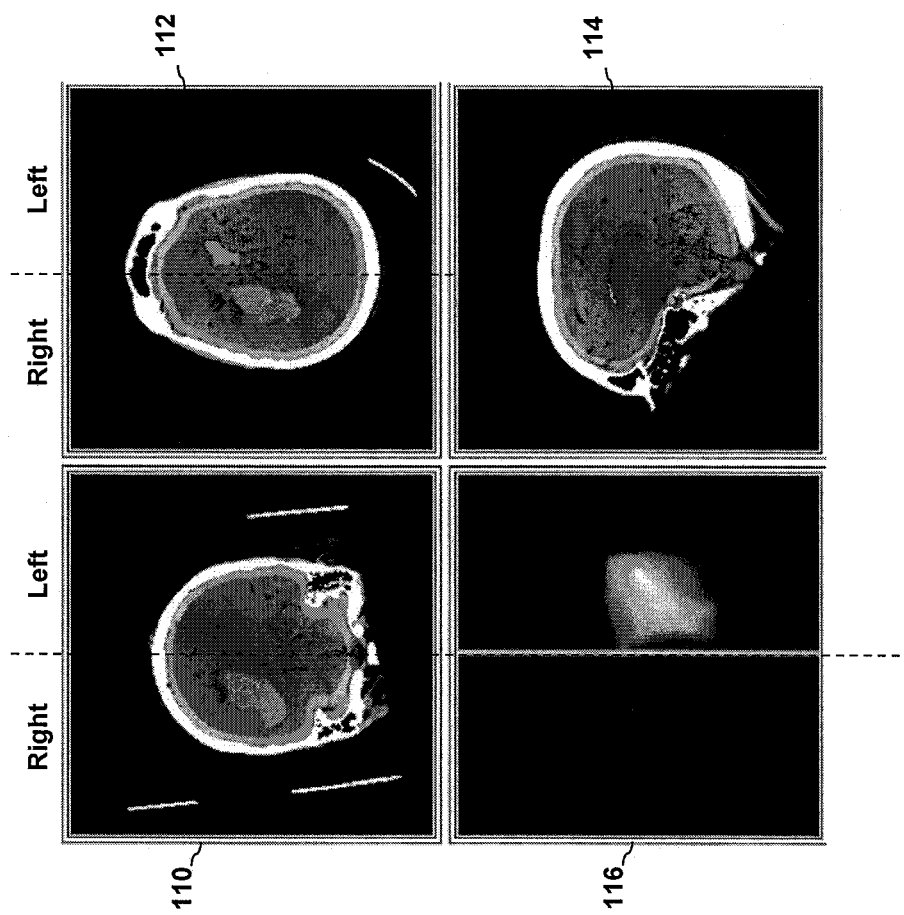
FIG. 1B depicts an example illustrating a medical scan of a head region of an unhealthy subject.

In contrast, FIG. 1B illustrates an example of a medical scan of a head region of an unhealthy subject. As shown in the coronal plain view 110 of the entire head regions, substantial hemorrhage appears to be located in the right portion of the brain. This hemorrhage is also shown in the transverse or axial plain view 112 of the entire head portion. Further, as illustrated in the transverse or axial plain view 112 of the entire head region, the anterior and posterior ventricles appear to have been shifted and are now located in the left portion of the brain. The shifting of the ventricles and a midline thereof is further illustrated in a projected two-dimensional view in the coronal plane 116 of the ventricles. As illustrated, substantially all of the anterior ventricles have been shifted to the left side of where the midline should normally be located.

In view of the severity of the abnormality as shown from this medical scan, it can be advantageous to ensure that the medical scan illustrated in FIG. 1B is reviewed before the medical scan of FIG. 1A if both scans are currently in a queue for review. Accordingly, in some embodiments, the system is configured to identify one or more of the aforementioned parameters which can suggest a high likelihood of a significant abnormality, and determine the need to review the medical scan illustrated in FIG. 1B at a higher priority. In certain embodiments, the system can be configured to actually move up the medical scan case in the queue. In other embodiments, the system can be configured to flag or otherwise mark such medical scans to allow a reviewing medical professional or radiologist to review this medical scan before others.

In certain embodiments, the system can be configured to notify a reviewing medical professional or radiologist via page, text message e-mail, phone call, or other means that a case with a higher likelihood of significant abnormality is ready for review.

System for Automated Analysis of Medical Scans

As various medical imaging techniques become more popular, a single hospital or medical facility can produce hundreds or thousands of new medical scans on a daily basis. Accordingly, it can be advantageous to implement the methods, systems, and devices for automated analysis of medical scans as described herein at a particular hospital or medical facility.

For example, the system can be implemented, incorporated, or embedded into a Picture Archiving and Communication System (PACS) 201 wherein the PACS system is configured to display medical scan cases and/or provide a workflow listing to a reviewing physician. In other embodiments, the system can be implemented as a standalone system 202 configured to communicate with one or more PACS systems or other hospital systems. In certain embodiments, the system can be implemented, incorporated, or embedded into a modality scanner 203, such as a CT scanner, MRI scanner, or the like.

In embodiments where the system is implemented, incorporated, or embedded into a modality scanner 203, the modality scanner and/or system can be configured to assign a grade and/or score to a medical scan case. The medical scan case can further be transmitted to another system, such as a PACS or third-party processor. The PACS or third-party processor can be configured to position the medical scan case in the queue based on its assigned grade and/or score relative to the other medical scan cases currently in the queue.

Figure 2A:
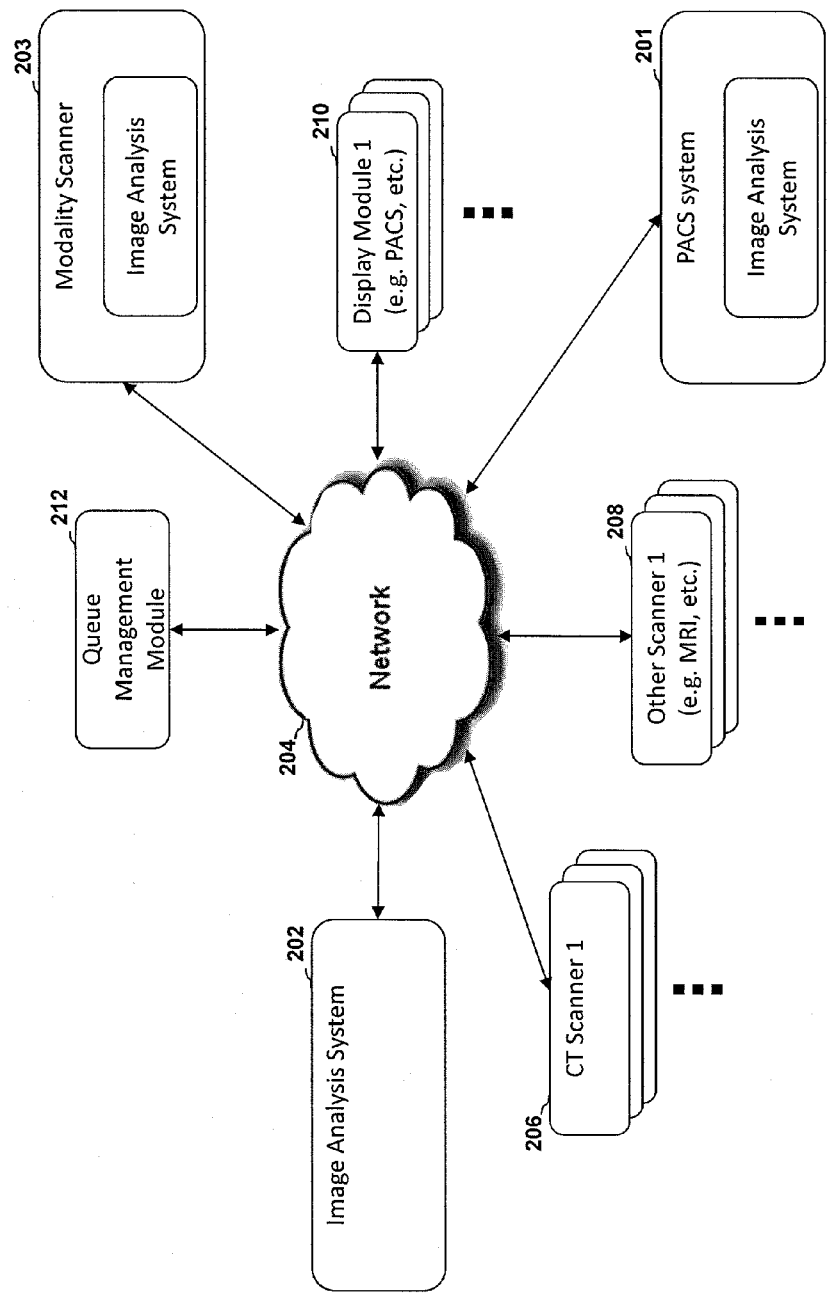
FIG. 2A-2B are block diagrams depicting embodiments of a system for automated analysis of a medical scan.
Figure 2B:
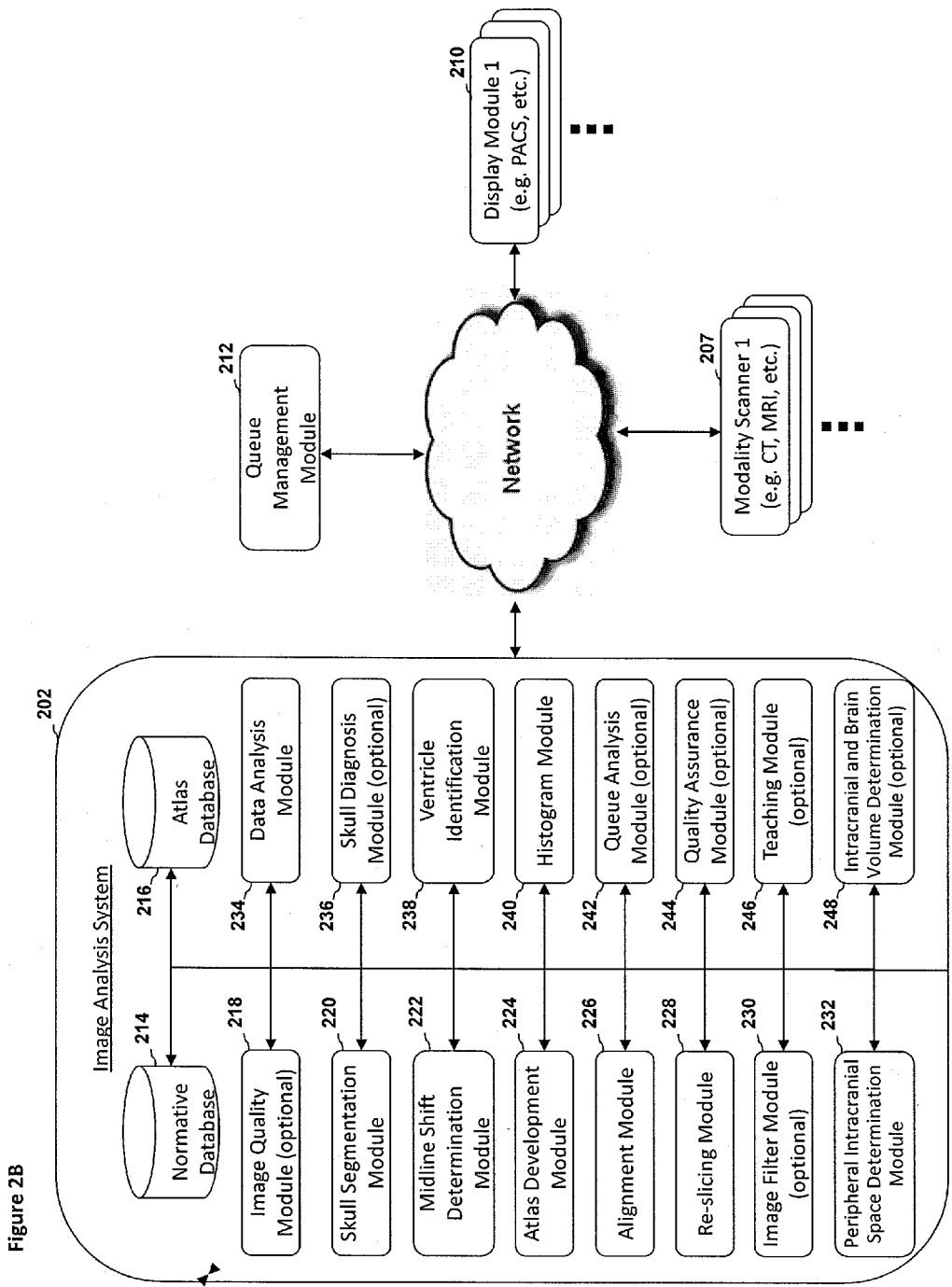

FIGS. 2A-2B illustrate examples of embodiments of a system for automated analysis medical scans that can be located at or be accessible by an existing computer system of a medical facility.

FIG. 2A illustrates a PACS comprising an image analysis system 201 that can be connected to a network 204. Additionally, FIG. 2A illustrates a standalone image analysis system 202 that can be connected to a network 204. Further, FIG. 2A illustrates a modality scanner comprising an image analysis system 203 that can be connected to a network.

The system as illustrated in FIG. 2A can further comprise one or more CT scanners or other modality scanners 206 that are located at a particular medical facility that can be connected to a network 204. Further, in some embodiments, the system can comprise one or more other modality scanners 208 that can be connected to a network 204. Such other modality scanners can comprise an MRI scanner, a CT scanner and/or an X-ray scanner or the like.

In addition, the system can comprise one or more display modules 210 that can be connected to a network 204. The one or more display modules 210 can comprise a PACS system, laptop, desktop computer, display system, or the like that are configured to display one or more medical scans to a reviewing medical professional.

In some embodiments, once a CT scanner 206 or other modality scanner 208 generates a medical scan of a patient, the scanned data is sent or otherwise transmitted over the network 204 to the image analysis system 202. The image analysis system 202 can be configured to analyze and/or conduct an initial review of the received scanned data and determine whether the scanned data comprises any signs of severe abnormalities and/or determine the severity thereof.

If the image analysis system 202 determines that the particular scanned data comprises potentially severe and/or time sensitive conditions, the queue management module 212 can be configured to ensure that the scanned data is reviewed by a medical professional before other less severe medical scans. For example, the queue management module 212 can be configured to actually move up the queue position of the severe medical scan or mark or label the medical scan such that a reviewing medical professional can review the particular medical scan first. In contrast, if the image analysis system 202 determines that a particular medical scan does not comprise any signs of severe abnormalities and/or time sensitive conditions, then the queue management module 212 can be configured to maintain the queue position of such less severe medical scan such that these medical scans are reviewed later by a medical professional. Those scans that have been either moved up in the queue by the queue management module 212 or labeled as time sensitive and/or severe by the queue management module 212 can be first displayed on a display module 212 for a medical professional to review such medical scans. In contrast, such medical scans with a lower queue position as configured by the queue management module 212 can be displayed on one or more display modules 210 at a later point in time for review and/or diagnosis by a medical professional.

In some embodiments, an image analysis system 202 can comprise one or more modules and/or one or more databases. FIG. 2B illustrates such modules and/or databases that can be part of and/or be accessible by an image analysis system 202. However, it is to be noted that an image analysis system 202 does not necessarily need to comprise all of such modules and/or databases. Rather, in some embodiments, an image analysis system 202 can comprise only a subset of the illustrated modules and/or databases.

In some embodiments, an image analysis system 202 can comprise an image quality module 218. Such image quality module can be configured to review the quality of a particular medical scan once the image analysis system 202 receives the medical scan from a modality scanner 207. In some embodiments, if an image quality of a particular medical scan does not satisfy a particular quality assessment or threshold, as determined by the image quality module 218, the image analysis system 202 can be configured not to further analyze and/or perform a triage or diagnosis analysis.

In certain embodiments, an image analysis system 202 comprises a skull segmentation module 220. The skull segmentation module 220 can be configured to map and/or segment the skull portion from a medical scan of an entire head region of a patient. By removing, labeling, and/or segmenting the skull portion, the image analysis system 202 can be configured to focus solely or specifically on the brain portion of the patient and thereby reduce the data set to be analyzed which can improve data processing efficiency and reduce the time necessary for processing a medical scan case.

In some embodiments, an image analysis system 202 can comprise a skull diagnosis module 236. The skull diagnosis module can be configured to focus on the segmented or labeled skull portion identified by the skull segmentation module 220 in order to analyze, triage, and/or diagnose the condition of the skull of a patient.

In certain embodiments, an image analysis system 202 can comprise a ventricle identification module 238. The ventricle identification module 238 can be configured to identify the location and/or condition of an anterior and/or posterior ventricle within the brain region of the scanned patient.

In certain embodiments, an image analysis system 202 can comprise a midline shift determination module 222. The midline shift determination module 222 can be configured to determine a distance, magnitude of, and/or how much a midline of the anterior ventricle has shifted in the subject patient.

In some embodiments, an image analysis system 202 comprises an atlas development module 224. The atlas development module 224 can be configured to develop an atlas comprising an average map and/or data of brain scans of a plurality of healthy subjects.

In certain embodiments, an image analysis system 202 comprises an alignment module 226. The alignment module 226 can be configured to align the position of a scanned data to a particular atlas that is pre-stored in the image analysis system. The one or more atlases can be stored in an atlas database 216 of an image analysis system 202.

In certain embodiments, an image analysis system 202 can comprise a re-slicing module 228. The re-slicing module 228 can be configured to re-slice the 'raw data' or the originally constructed volumetric data obtained from a medical scan in order to ensure that the orientation and/or size of particular slices of the volumetric data are consistent with prior scan slice orientation on the same patient, allowing faster comparison between exams that are oriented at differing angles and pitches and fields of view.

In some embodiments, an image analysis system 202 comprises an image filter module 230. The image filter module 230 can be configured to apply an image processing filter to a medical scan in order to improve smoothness or otherwise improve the quality of a scanned image. For example, the image filter module 230 can comprise a Gaussian filter, a nearest neighbor filter, or the like.

In some embodiments, an image analysis system 202 comprises a peripheral intracranial space determination module 232. The peripheral intracranial space determination module 232 can be configured to determine a peripheral intracranial space of a brain of a subject patient. By determining and/or segmenting the peripheral intracranial space of a medical scan of a brain region of a patient, the image analysis system 202 can selectively analyze either the peripheral intracranial space or the central intracranial alone or the whole intracranial space.

In certain embodiments, an image analysis system 202 comprises a data analysis module 234. The data analysis module 234 can be configured to analyze one or more particular regions within a medical scan as determined by the image analysis system 202 or other modules thereof. For example, the data analysis module 234 can be configured to compare one or more parameters and/or characteristics identified in the scanned data to normative data that is stored in a normative database 214 of the image analysis system 202.

In certain embodiments, an image analysis system 202 comprises a histogram module 240. The histogram module 240 can be configured to generate one or more histograms based on the analyzed data. The one or more histograms that are generated by the histogram module 240 can allow the image analysis system 202 to more efficiently analyze and/or review a particular medical scan. The one or more histograms can be outputted into a report for review by a user.

In some embodiments, an image analysis system 202 comprises a queue analysis module 242. The queue analysis module 242 can be configured to analyze and/or label a medical scan case. The queue analysis module 242 can be configured to analyze the medical scan data, histogram data, and/or other data of the medical scan to generate a flag, score, grade, or the like for indicating the priority of the medical scan case.

In certain embodiments, an image analysis system 202 can comprise a quality assurance module 244. The quality assurance module 244 can be configured to analyze and/or review the level of quality of a reviewing medical professional by comparing an analysis conducted by a medical professional to an analysis conducted by the image analysis system 202.

In certain embodiments, an image analysis system 202 can comprise a teaching module 246. The teaching module 246 can be configured to guide or otherwise teach a medical professional in reviewing medical scans.

In some embodiments, an image analysis system 202 can comprise an intracranial and a brain volume determination module 248. The brain volume determination module 248 can be configured to calculate and/or otherwise determine a volume of the intracranial space and of the brain of a subject based on the volumetric data.

In some embodiments, one or more medical scans that have been analyzed and/or reviewed by the image analysis system 202 and/or the queue management module 212 can be transmitted via the network to one or more display modules 210 for displaying the one or more medical scans to a medical professional for review and/or further analysis.

In some embodiments, scans that have been found to be normal by the medical professional or radiologist can be evaluated to create a risk score of abnormality with attention to a particular region and a particular type of abnormality to encourage a 'second look' if a particular threshold of suspected abnormality is reached.

Remote System for Automated Analysis of Medical Scans

There is an increasing number of remote medical facilities that offer one or more medical services, for example teleradiology services. Further, in some situations, a patient may obtain a medical scan from one medical facility but the medical scan may be reviewed by a physician at another medical facility for diagnosis and/or review purposes of the medical scan. An example of such medical facilities is StatRad™ or other third party facilities that provide outsourced medical services.

Figure 3:
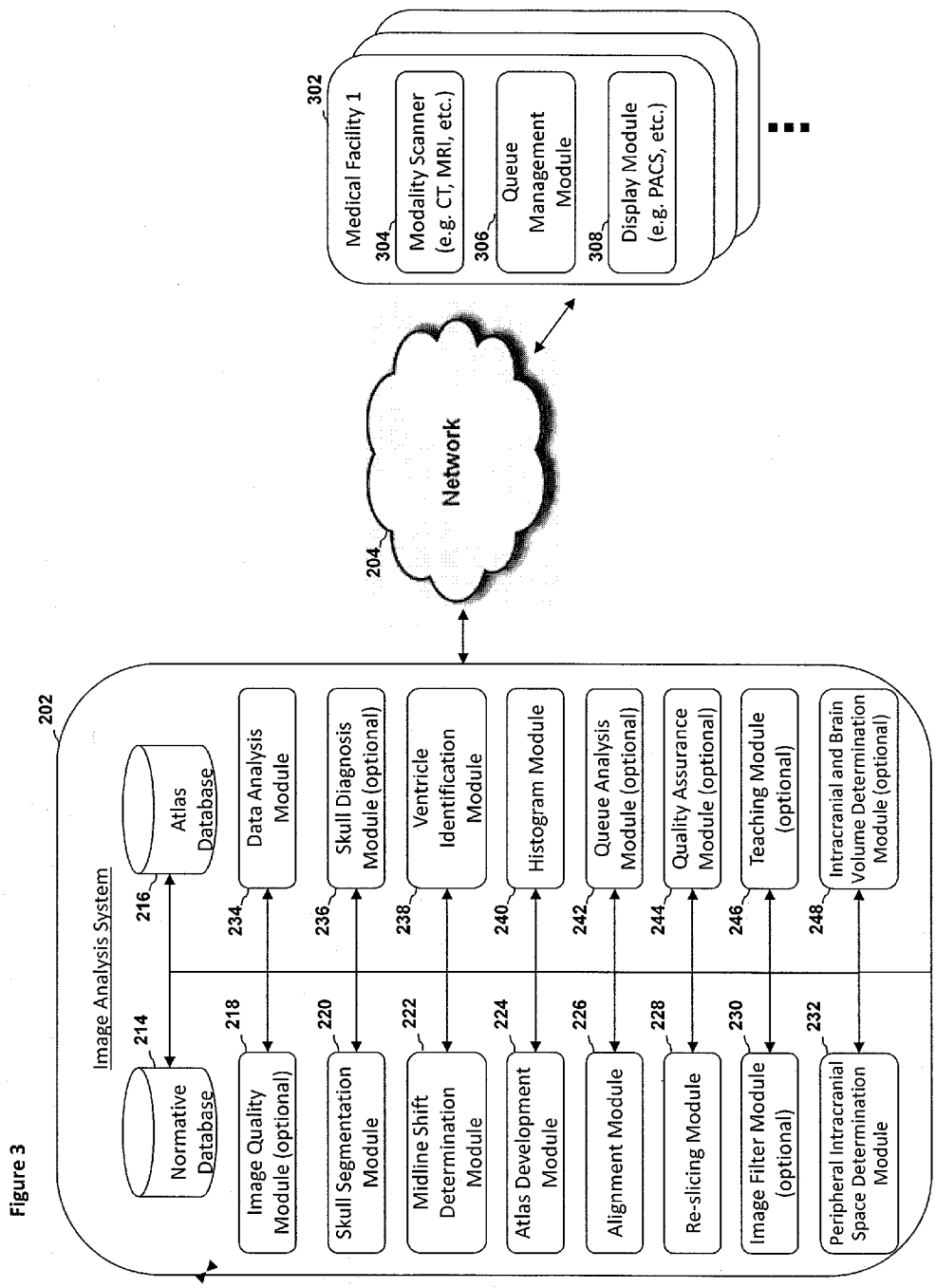
FIG. 3 is a block diagram depicting an embodiment of a system for automated analysis of medical scans that is located remotely from one or more medical facilities.

Accordingly, it can be advantageous to provide an image analysis system that is located remotely from a medical facility that produces medical scans, for example, the image analysis system can be located at a teleradiology services provider that desires to review emergency or severe cases before less severe cases. Alternatively, the image analysis system can be provided as a software as a service (SaaS) whereby medical scans are produced at a medical facility, which transmits the medical scan to an image analysis system that is located remotely from the medical facility and whereby the image analysis system is configured to analyze the medical scan to determine a priority ranking for the medical scan. The medical scan with the determined priority ranking can be returned to the originating medical facility for review and analysis by a medical professional who will review the medical scan based on the priority ranking. FIG. 3 illustrates an example of an embodiment of a system for automated analysis of medical scans that is located remotely from one or more medical facilities.

As illustrated in FIG. 3 an image analysis system 202 can be located remotely from one or more medical facilities 302. The image analysis system 202 can be configured to communicate with one or more medical facilities 302 over a network 204 display its remote location.

The image analysis system 202 in such embodiments can comprise one or more modules and/or databases. For example, the image analysis system 202 in such embodiments can comprise the same and/or a subset of the various modules and/or databases as described above in connection with FIG. 2B.

The one or more medical facilities 302 can comprise one or more modality scanners 304. The one or more modality scanners 304 can be configured to generate a medical scan of a patient and transmit the scanned data over the network 204 to the remotely located image analysis system 202. The image analysis system 202 can be configured to conduct an initial review and/or analysis of the received scanned data and send it back to a queue management module 306 of one or more medical facilities 302.

The queue management module 306 located at the one or more medical facilities 302 can be configured to manage the queue positions of one or more medical scans. In certain embodiments, depending on the queue position of a particular medical scan as managed by the queue management module 306, a medical scan can be transmitted to one or more display modules 308 located at the one or more medical facilities 302 in the order of its queue. The one or more display modules 308 located at the one or more medical facilities 302 can be configured to display a medical scan to a medical professional for further review and/or analysis.

In addition, in some embodiments, the image analysis system can be provided as a software as a service (SaaS) whereby individual patients, users, and/or agents can transmit or instruct analysis of one or more scans to the system and whereby the system is configured to analyze the one or more medical scans. For example, a system can be configured to receive one or more scans from a patient, user, agent, and/or medical facility, over a network for example, wherein the one or more scans are of a same patient over a period of time. The system can be configured to analyze the one or more scans based on one or more parameters and/or generate a report that can be transmitted to the patient, user, and/or agent. For example, the system can be configured to analyze the one or more scans over a period of time based on changes in brain volume, midline shifts, density curves, or the like.

In certain embodiments, the system can be configured to store one or more scans of a patient as they are received from a patient, user, agent, and/or medical facility, for example over a network. In some embodiments, the system can be configured to store updated scans of the patient as they are generated and/or transmitted by a patient, user, agent, and/or medical facility. The system can be configured to receive instructions from a patient, user, and/or agent to analyze one or more selected scans from the stored scans. For example, if the system has a plurality of scans of a particular patient stored, a patient, user, and/or agent can instruct the system to conduct an analysis of a subset of the plurality of scans to determine changes in one or more parameters over the selected subset of scans.

Automated Reorientation and/or Analysis of Medical Scans

Figure 4A:
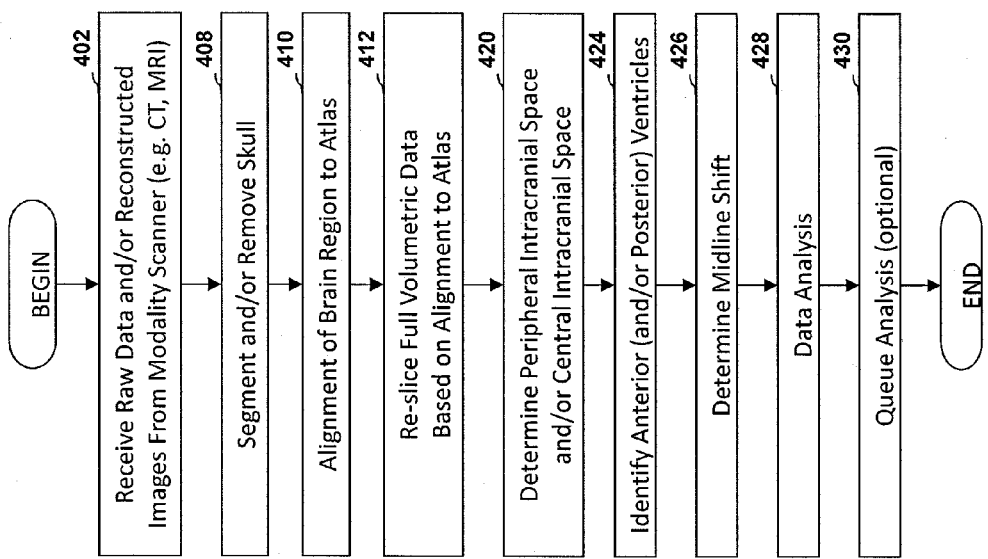
FIG. 4A is a process flow diagram illustrating an example of an embodiment of automated analysis of medical scans.

FIG. 4A illustrates an overview of an example of an embodiment of automated reorientation and/or analysis of medical scans. The reorientation can be performed as a standalone function of the system with or without performing one or more analyses of the medical scan, for example, triage analysis and/or diagnosis.

In some embodiments, at block 402, an image analysis system can access scanned data that is generated from one or more modality scanners. The image analysis system can be configured to access raw data and/or reconstructed image data from the one or more modality scanners. For example, in some embodiments, the image analysis system is configured to access and apply one or more reorientation algorithms to the raw data or to already processed and reconstructed image data. In some circumstances, acting on the raw data may give a cleaner image data set. Accordingly, in certain embodiments, the image scanner system can be incorporated into one or more modality scanners.

The modality scanners can comprise a CT scanner, CAT scanner, MRI scanner, X-ray scanner, ultrasound scanner, or the like. The accessed data from a modality scanner that is sent to an image analysis system can be for example a CAT scan of a head region of a patient. In certain embodiments, the system can be configured to identify a data set corresponding to the location of the skull within the head region, and the system can be configured to segment out and/or label the data set corresponding to the skull portion at block 408. Optionally, the system can be configured to separately label a second data set that corresponds to the internal brain region or whole intracranial space within the skull portion at block 408.

In some embodiments, at block 410, the system can be configured to analyze data corresponding to the whole intracranial space in order to align the whole intracranial space to an atlas as determined by the system. At block 412, in certain embodiments, from either the raw data or the originally reconstructed data set, a new, reoriented full volumetric data set can be re-sliced based on the alignment to the atlas. For example, the acquired data set that has been aligned to an atlas can be re-sliced in order to reduce error in further analysis processes.

In some embodiments, at block 420, a peripheral intracranial space and/or central intracranial space can be determined. For example, the system can be configured to determine the whole intracranial space within the skull. The system can further be configured to label an outer boundary or periphery region of the whole intracranial space as peripheral intracranial space and the remaining interior region as central intracranial space. In some embodiments, the system can be configured to segment the peripheral intracranial space for further analysis of the peripheral and/or central intracranial spaces.

In certain embodiments, at block 424, the anterior and/or posterior ventricles can be identified in the central intracranial space. At block 426, based on the identified anterior and/or posterior ventricles the system can be configured to determine a midline shift of the ventricles from the center of the brain and/or the expected location of the midline based on the atlas.

In some embodiments, at block 428, one or more aspects, parameters, and/or characteristics of the data can be analyzed. At block 430, based on the analyzed data, a queue position of the medical scan can be analyzed and/or determined.

FIG. 4B illustrates an overview of another example of an embodiment of automated reorientation and/or analysis of medical scans.

In some embodiments, at block 402, an image analysis system can access scanned data that is generated from one or more modality scanners. The image analysis system can be configured to access raw data and/or reconstructed image data from the one or more modality scanners. For example, in some embodiments, the image analysis system is configured to access and apply one or more reorientation algorithms to the raw data or to already processed and reconstructed image data. In some circumstances, acting on the raw data may give a cleaner image data set. Accordingly, in certain embodiments, the image scanner system can be incorporated into one or more modality scanners. The modality scanners can comprise a CT scanner, CAT scanner, MRI scanner, X-ray scanner, ultrasound scanner, or the like. The data from a modality scanner that is sent to an image analysis system can be for example a CAT scan of a head region of a patient.

In certain embodiments, the data can be assessed for image quality at block 404. The assess image quality block 404 can be optional in some embodiments. For example, at block 404, the system can be configured to identify any metal and/or motion artifacts in the data. Metal artifacts can appear in scanned data of post-operative patients who may have surgical clips or aneurysm coils, which can cause an increased amount of artifacts surrounding such items. Further, motion by a subject patient during a modality scan can cause one or more artifacts as well.

Depending on the quality of the scan or image, the effectiveness of an analysis might not be as useful. Accordingly, in some embodiments, the system can be configured to determine whether the image quality of a scanned data set satisfies a threshold level at block 406.

In some embodiments, if the image quality of the scan data does not satisfy a predetermined threshold level, the system is configured to conduct one or more alternative analyses or an alternative orientation process of the medical scan case at block 407. For example, in certain embodiments, a system can be configured to apply an alternative automated method and/or manual system based on identifying landmarks to further analyze, triage, and/or diagnose the medical scan case. In such embodiments, the system can be configured to further analyze the scanned data if the alternative analysis at block 407 shows acceptable levels of image quality. However, in other embodiments, if the image quality of an acquired scanned data does not satisfy a predetermined threshold level, the process can end.

Alternatively, in certain embodiments, if the image quality of a scanned data satisfies a threshold level, the system can be configured to segment or label a data set corresponding to the skull region at block 408. Optionally, the system can be configured to separately label, segment, and/or otherwise focus on a second data set that corresponds to the whole intracranial space within the skull at block 408.

In some embodiments, the system can be configured to generate a labeled data set, segmented data set, and/or otherwise focus on the segmented skull region of a scanned head region of a patient for further analysis of the skull portion at block 436. For example, the system can be configured to identify and/or determine the existence of fractures, metastases, or other abnormalities in the skull portion. The skull diagnosis block 436 can be optional in some embodiments. Based on a skull diagnosis, the system can be configured to further analyze data relating to the skull portion at block 428.

In certain embodiments, the system is configured to align the whole intracranial space to an atlas at block 410. The atlas can be selected among one or more atlases predetermined and stored in the system. For example, an atlas can be particularly useful for a certain age group, sex, type of modality scanner, manufacturer of modality scanner, or the like.

The system can further be configured to re-slice the acquired data set based on the alignment to the predetermined atlas at block 412. In some embodiments, the system can be configured to assess the alignment of the scanned data to a predetermined atlas at block 414. Based on the assessment, the system can be configured to determine whether the alignment of the scanned data to the atlas satisfies a threshold level at block 416.

In some embodiments, if a level of alignment between a medical scan case and the atlas does not satisfy a predetermined threshold level, the system is configured to conduct one or more alternative analyses or an alternative orientation process of the medical scan case at block 417. For example, in certain embodiments, a system can be configured to apply an alternative automated method and/or manual system based on identifying landmarks to further analyze, triage, and/or diagnose the medical scan case. However, in other embodiments, if the level of alignment between a medical scan case and the atlas does not satisfy a predetermined threshold level, the process can end.

Alternatively, if a level of alignment to the predetermined atlas satisfies a threshold level, the system can be configured to post-process the image pixels of the scanned data at block 418. For example, the system can be configured to apply an image filter or smooth out pixels in a scanned data set by comparing a particular pixel to its nearest neighboring pixels and/or otherwise improve the quality of the scanned image. In some embodiments, the system can be configured to apply a Gaussian filter or the like to improve the signal noise of the image without destroying any data. The application of an image filter at block 418 can be optional in certain embodiments.

In some embodiments, at block 420, a peripheral intracranial space and/or central intracranial space can be determined. For example, the system can be configured to determine the whole intracranial space within the skull. The system can further be configured to label an outer boundary or periphery region of the whole intracranial space as peripheral intracranial space and the remaining interior region as central intracranial space. In some embodiments, the system can be configured to segment the peripheral intracranial space for further analysis of the peripheral and/or central intracranial spaces.

In some embodiments, at block 422, the system is configured to compute the intracranial brain volume of the medical scan data by determining the number of voxels corresponding to the internal brain region or with density values within a predetermined range. Based on the computed brain volume, the system can be configured to compare the computed brain volume of the medical scan data to one or more predetermined atlases. The computing and comparing of the brain volume at block 422 can be optional in certain embodiments.

In some embodiments, at block 424, the system can be configured to identify anterior and/or posterior ventricles located within the brain region of the scanned data. Based on the identified anterior and/or posterior ventricles, the system can be configured to determine the location of the midline at block 426. Based on the determined location of the actual midline of the scanned data, the system can be configured to compare the actual location of the midline to where the midline should be or is expected to be based on the atlas and/or normative data. Based on the comparison, the system can be configured to determine a midline shift at block 426.

In certain embodiments, at block 428, the system can be configured to conduct one or more data analyses of the entire head region of the scanned data and/or one or more portions thereof. For example, the system can be configured to conduct a data analysis of the whole intracranial region or only the skull region. Further, the system can be configured to conduct a data analysis of only the periphery intracranial space or the central intracranial space.

Based on the identified anterior and/or posterior ventricles, determined midline shift, and/or other data analyses, a system can be configured to conduct a queue analysis at block 430. From the queue analysis, the system can be configured to maintain, determine a grade or score, and/or otherwise alter the queue position of a medical scan.

In certain embodiments, based on the identified anterior and/or posterior ventricles, determined midline shift, and/or other data analyses, the system can be configured to conduct a quality assurance analysis at block 432. The quality assurance analysis can be configured to determine whether a medical professional is or has been reviewing and analyzing medical scans correctly. The quality assurance block 432 can be optional in certain embodiments.

In some embodiments, based on the identified anterior and/or posterior ventricles, determined midline shift and/or other data analyses, the system can be configured to be utilized as a teaching tool at block 434. The teaching tool process can be configured to aid medical professionals in learning to how to better review and/or analyze medical scans. The teaching tool block 434 can be optional in certain embodiments.

Skull Segmentation

Generally, a scan of a head region of a patient comprises a skull and a brain region (or intracranial space) located within the skull. The configuration and/or shape of a skull of a particular patient can vary widely from that of other patients. However, the overall configuration and/or shape of the brain region of a particular patient generally does not vary substantially from that of other patients. Accordingly, in order to conduct a comparison of scan data of a particular patient to other patients and/or a normative set of data, it can be advantageous to segment out the skull from a scanned data set of a head region in order to reduce the data set and speed up the processing.

Further, by segmenting out the skull portion, a system can be allowed to further diagnose and/or review a skull portion by itself. For example, by focusing solely on the skull portion a system can be configured to more efficiently determine whether there are any fractures and/or other abnormalities in the skull of a patient. In addition, because data related to the skull is segmented out, a system can more efficiently process a comparison and/or analysis or other analysis of the internal brain region of a patient. As such, in some embodiments, the system is configured to identify and/or segment out a skull portion from a scanned data of an entire head region of a patient.

Figure 5:
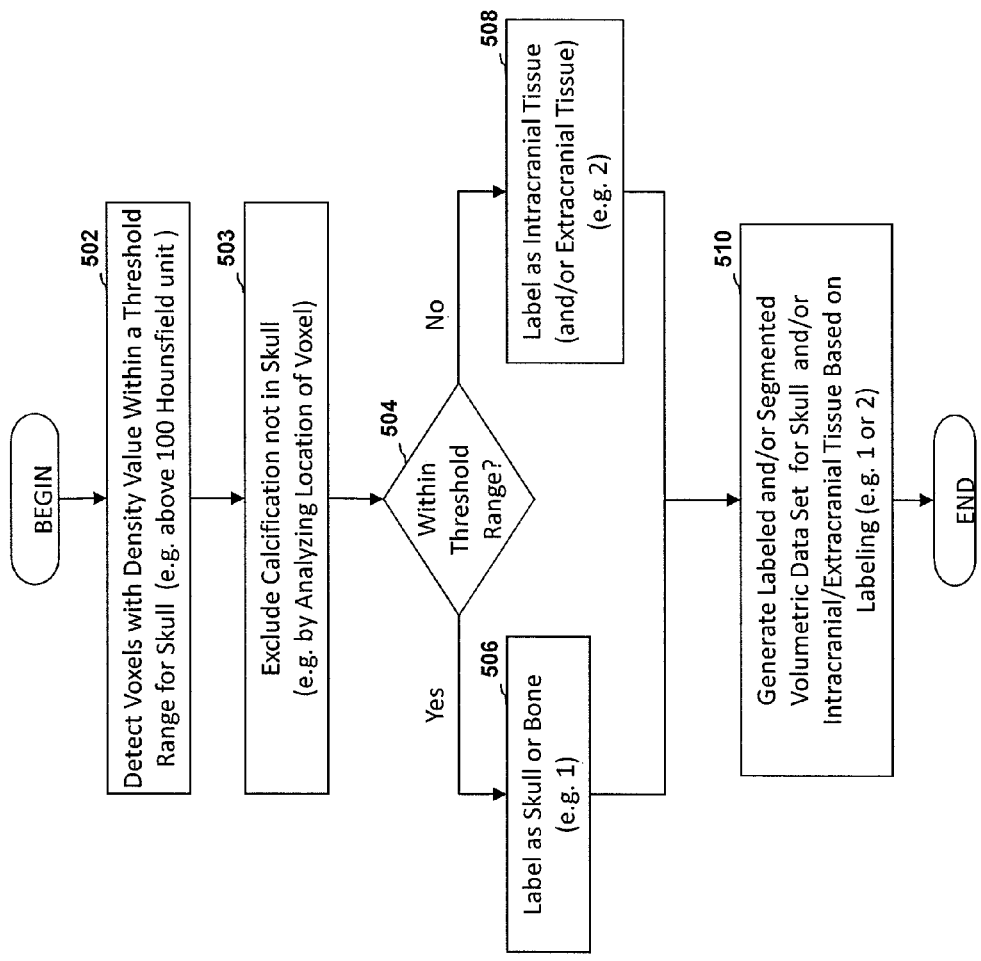
FIG. 5 is a process flow diagram illustrating an example of an embodiment of segmenting a skull.

FIG. 5 illustrates an overview of an example of an embodiment of segmenting a skull. At block 502, the system can be configured to detect voxels from the scanned volumetric data set with density or intensity values above a particular threshold value or within a range of values that is known to be a skull. For example, in a CT scan, voxels with intensity values of about 100 Hounsfield units or above can correspond to the location of skull and/or other bone structure. Accordingly, the system can be configured to detect any and all voxels in a scanned volumetric data set of a head region of a patient with an intensity value at or above about 100 Hounsfield units and identify those voxels as corresponding to the skull of the patient.

In some embodiments, at block 503, the system can be configured to exclude calcification that is not the skull. In other words, in certain embodiments, the system is configured to use location data to determine if a voxel with a density or intensity value within a range of interest is in fact part of the skull or not. For example, some calcification can be located in the midline or other intracranial spaces, such as the pineal gland and the basal ganglia yet comprise voxel densities that correspond to a predetermined range set for skull. Based on the difference in location, the system can be configured to exclude such voxels in the intracranial space in determining the configuration of the skull.

In certain embodiments, at block 504, the system can be configured to determine whether a particular voxel comprises a density within the threshold range, for example, is the Hounsfield unit of the particular voxel at 100 Hounsfield units or above. If a particular voxel comprises a density value within the threshold range and/or if the location of the voxel is in line with an expected location of the skull, the system can be configured to label that voxel as skull. For example, in a binary processing system, the system can be configured to label that particular voxel as one.

In contrast, if a particular voxel comprises a density value outside of the threshold range, for example lower than 100 Hounsfield units for a CT scan and/or located within the intracranial space, the system can be configured to label that particular voxel as intracranial tissue at block 508. For example, in a binary processing system, the system can be configured to label voxels corresponding to intracranial tissue as two.

In certain embodiments, the system is configured to identify and label voxels comprising density values outside of the threshold range and located on the exterior of the skull as extracranial tissue. Identification of near-field extracranial soft tissue can be helpful in detecting and/or diagnosing particular conditions, such as hematoma which suggests significant trauma.

After labeling all of the particular voxels as corresponding to either skull or other tissue, the system can be configured to generate a shadow or label data set for the skull and/or other tissue at block 510. For example, in a binary processing system, the system can be configured to generate a map that labels the entire head region as being either skull or other tissue. Further, in certain embodiments, the system can be configured to generate a segmented data volume using the label data set. In other words, the system can be configured to delete, remove intensity values, and/or set the intensity values to zero of certain voxels to obtain a segmented volumetric data set. The segmented volumetric data set can comprise only those intensity values of voxels corresponding to a tissue and/or region of interest. Such a labeled and/or segmented volumetric data set can be stored in the system in addition to the original volumetric data set of the entire head region in some embodiments.

Figure 5A:
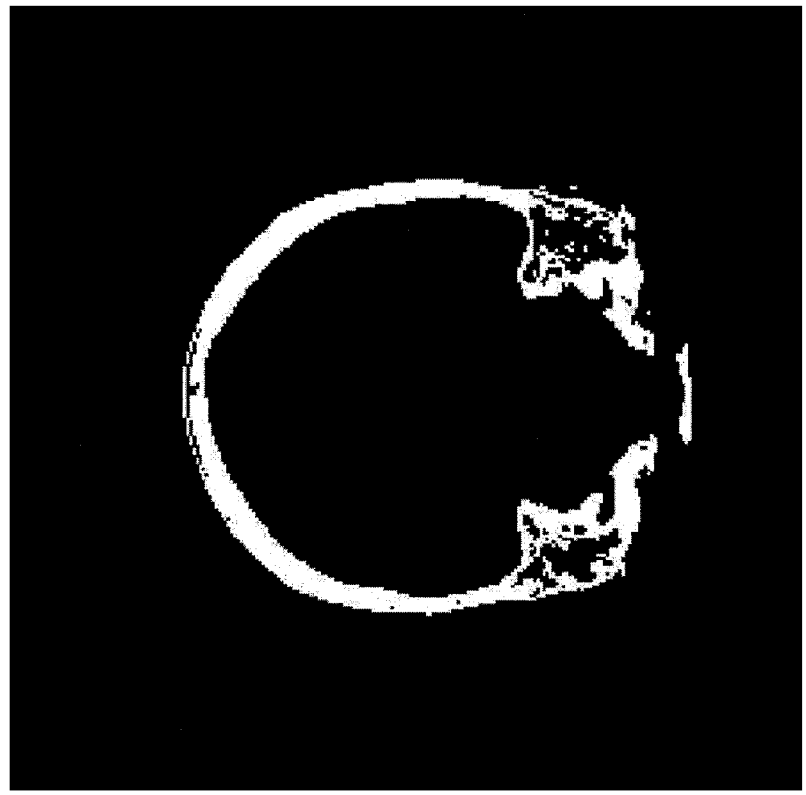
FIG. 5A depicts an example illustrating a labeled data set of a skull.

FIG. 5A illustrates an example of a labeled data set of skull. As illustrated, only those voxels corresponding to skull, as determined by the system, appear in the labeled data set.

Atlas Development

In order to efficiently conduct an initial review and/or analysis of a medical scan, it can be advantageous to compare a medical scan to normative data of healthy subjects of the same region. For example, a medical scan of a head region of a patient or a portion thereof, such as the intracranial space, can be compared to a normative scan data of intracranial spaces of healthy patients. By comparing a medical scan of an intracranial space of a patient to intracranial spaces of healthy patients, a system can be configured to efficiently and effectively conduct an automated analysis of the intracranial space of the patient, for example, within one minute or less. In order to do such comparison to scan data of healthy patients, a point of reference and/or comparison can be first developed and be stored in the system. Accordingly, in some embodiments, an atlas of normative data of intracranial spaces of healthy subjects is predeveloped and prestored in the system.

Figure 6:
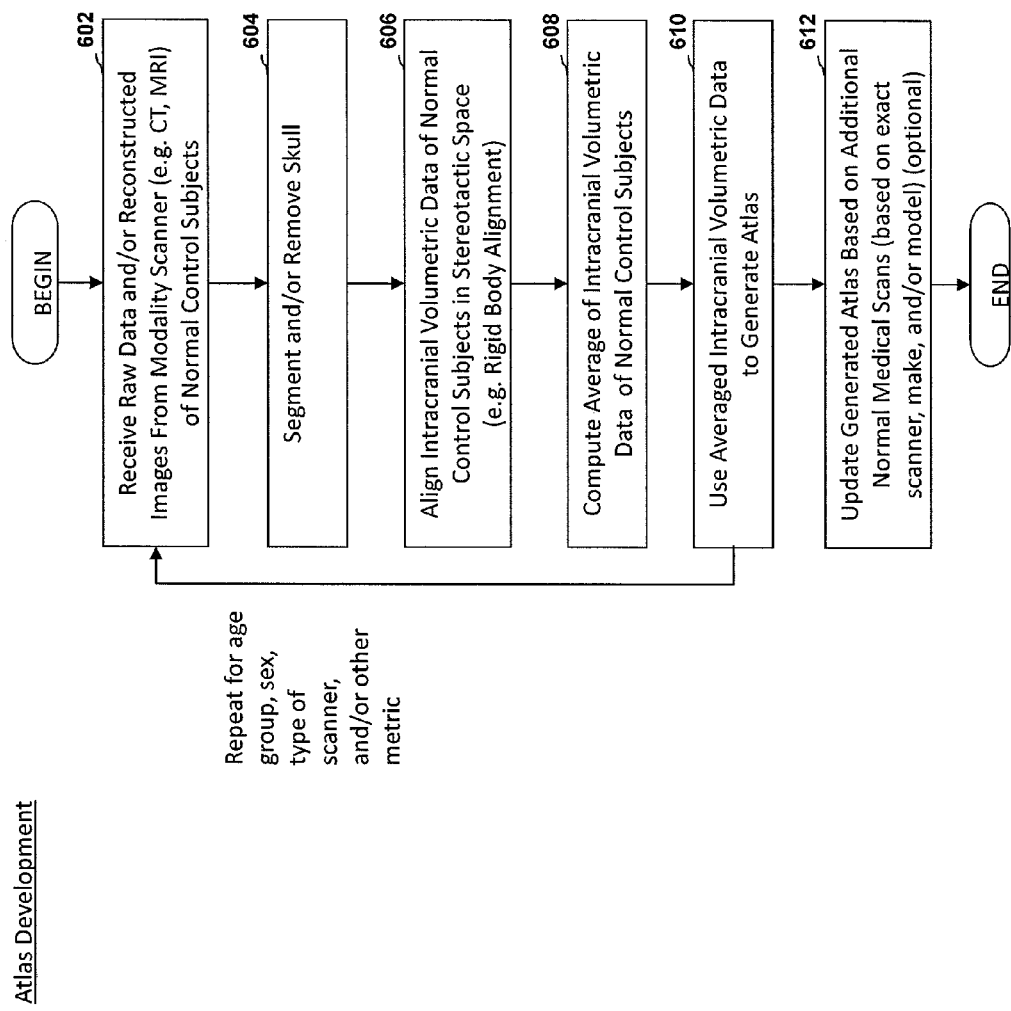
FIG. 6 is a process flow diagram illustrating an example of an embodiment of developing an atlas.

FIG. 6 illustrates an overview of an example of an embodiment of developing an atlas. In some embodiments, at block 602, the system is configured to access modality scanner data of normal control subjects of a particular region. For example, the system can be configured to receive raw data and/or reconstructed images from one or more modality scanners of normal control subjects or healthy patients. The modality scanner data can be from a CT scanner, CAT scanner, MRI scanner, x-ray scanner, ultrasound scanner, or the like.

In certain embodiments, the system is further configured to segment and/or remove skull from the modality scanner data of normal control subjects at block 604 by one or more methods discussed above. By segmenting the skull from the modality scanner data of normal control subjects, the system can be configured to focus solely on the intracranial space of the normal control subjects. As discussed above, the configuration and/or shape of skulls of a plurality of normal control subjects can substantially vary. However, the configuration and/or shape of the intracranial space of a plurality of normal control subjects may not vary substantially and therefore can be averaged and/or otherwise combined to generate an atlas.

In some embodiments, at block 606, the system is configured to align the intracranial volumetric data after segmenting the skull of normal control subjects in stereotactic space. For example, the system can be configured to align the intracranial space of the volumetric data obtained from normal control subjects by applying rigid body alignment or any other alignment method in order to align the plurality of intracranial volumetric data of normal control subjects.

In certain embodiments, at block 608, the system can be configured to compute an average of the aligned intracranial volumetric data of normal control subjects. For example, the system can be configured to compute and average and/or otherwise combine the aligned intracranial space of the volumetric data that is obtained from the normal control subjects via a modality scanner.

In certain embodiments, at block 610, the system can be configured to use the averaged intracranial volumetric data of normal control subjects to generate an atlas and/or point of comparison to be later used to compare a scanned data set of a particular subject or patient of interest.

In certain embodiments, blocks 602 through 610 can be repeated for a number of parameters for a number of subjects for a particular parameter and/or characteristic. For example, blocks 602 through 610 can be repeated for a plurality of normal control subjects for a particular age group and/or sex, a particular type of scanner, and/or other metric. It can be advantageous to develop an atlas that is age-specific, because with age atrophy of the brain can cause reduction and brain parenchyma and increase in spinal fluid. Further, it can be advantageous to develop an atlas that is scanner or manufacturer-specific, because each of the equipment manufacturers can make their scanners a little different and can comprise different artifacts. As such, for example, in some embodiments, blocks 602 through 610 can be repeated for a CT scanner and/or a particular type or manufacturer of a CT scanner.

In some embodiments, the system is configured to further update the generated atlas based on medical scans that are determined to be normal at block 612. In other words, the system can be configured to update a generic atlas by including one or more studies or medical scans that are found to be normal to develop an iterative atlas.

In certain embodiments, the system is configured to update a particular atlas associated with a particular patient age group, sex, scanner or type thereof with only those normal medical scans taken of or from the particular patient age group, sex, scanner or type thereof. For example, the system can be configured to include only those normal medical scans obtained from a particular scanner in updating a generic atlas for that particular scanner. By limiting updates to an atlas with only those scans found to be normal and obtained from an exact scanner, artifacts that are specific to that exact scanner can be taken into account, which can change after a machine upgrade, a service visit, or the like.

In certain embodiments, the system can be configured to include only those normal medical scans obtained from a scanner of a particular make and/or model in updating a generic atlas that is specific to one or more scanners of a particular make and/or model. Further, in some embodiments, the system can be configured to include only those normal medical scans obtained from patients of a particular age group and/or sex in updating a generic atlas that is specific to a particular age group and/or sex. The update atlas block 612 can be repeated in real time, near real time, and/or periodically at predetermined intervals of time and/or when a predetermined number of normal medical scans of a particular type are obtained.

Alignment to Atlas & Re-Slicing Data Set

In order to effectively compare scan data from a subject of interest to an atlas and/or other normative set of data, it can be advantageous to align the scan data to the particular atlas. For example, an intracranial space of a subject of interest can be aligned with an atlas obtained from a plurality of intracranial spaces of normal control subjects for further analysis. By aligning the scan data to a particular atlas, any further analysis of the scan data can be more accurate. Further, when a medical professional scans a region of a patient using one or more modality scanners, the orientation of the patient within the modality scanner can be different every time. However, it can be advantageous to compare a scan with one or more prior scans. When the orientation of the current and one or more prior scans is identical, comparison is faster and easier, thereby allowing differences to be more readily observed, whether review of the scans are performed by a medical professional, for example for diagnosis, or by an automated system, for triage or queue analysis for example. Also, reproducible orientation can allow subtraction scans to be performed. For example, when scans are separated in time, the old scan density can be subtracted from the new data, giving a "difference" image.

Figure 7:
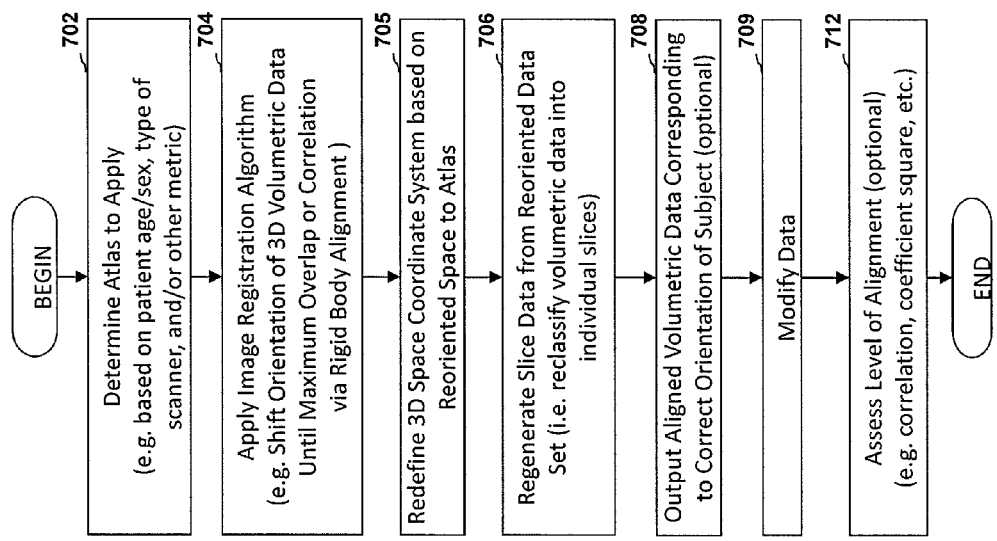
FIG. 7 is a process flow diagram illustrating an example of an embodiment of aligning scanned subject data to an atlas and re-slicing the scanned subject data.

Accordingly, in some embodiments, the system is configured to align scan data to an atlas and further reslice the scan data set. The alignment and/or reorientation can be performed as a standalone function of the system with or without performing one or more analyses of the medical scan, for example, triage analysis and/or diagnosis. FIG. 7 illustrates an overview example of an embodiment of aligning scan subject data to an atlas and reslicing the scanned subject data.

Modality scanners generally generate raw data that is initially converted to source, axial, volumetric data. Coronal and/or sagittal images can be reconstructed from the source, axial, volumetric data. In some embodiments, the reorientation process as described herein can transform the raw data to generate a new set of source images with a preferred orientation and field of view, for example for reproducibility and comparison purposes. Alternatively, in certain embodiments, the reorientation can be performed upon the source, axial, volumetric data.

In some embodiments, the system can configured to align only the intracranial space of scanned data to an atlas because there can be less discrepancies between the intracranial spaces of a plurality of subjects. In other embodiments, the system can be configured to align the whole scan region.

In some embodiments, at block 702, the system is configured to determine an appropriate atlas to apply. The appropriate atlas to apply can be based on an age group and/or sex of the subject patient of interest. In certain embodiments, the appropriate atlas to apply can depend on the type of modality scanner, a specific manufacturer of the modality scanner and/or any other metric.

In certain embodiments, the system can be configured to apply an image registration algorithm at block 704 in order to align the scanned data to the selected atlas. For example, the system can be configured to shift the orientation and/or location of the three-dimensional scanned volumetric data in reference to the selected atlas until a maximum overlap or correlation occurs. The shifting of the orientation and/or location can be conducted via a rigid body alignment. In other words, the system can be configured to only translate and rotate and not stretch and/or compress the voxels and/or orientation of the scanned subject data in certain embodiments. Once the maximum overlap or correlation between the three-dimensional scanned volumetric data and the selected atlas is determined, such orientation and/or location can be saved in the system.

In some embodiments, the system is configured to redefine a three dimensional coordinate system based on the reoriented space to an atlas at block 705. For example, the system can be configured to redefine a point in the three-dimensional volumetric data set as (0, 0, 0). By redefining a point of reference in the volumetric data set, it can be advantageous in comparing one study to another by tracking where a particular point of interest is using the reoriented data and coordinate system.

In some embodiments, at block 706, the system can be configured to reslice the aligned three-dimensional volumetric data into two-dimensional slices. In other words, the system can be configured to reclassify the now aligned three-dimensional volumetric data into individual slices for further processing.

In some embodiments, at block 708, the system can be configured to output the aligned three-dimensional volumetric data corresponding to a correct orientation of the subject. This aligned volumetric data corresponding to a correct orientation of the subject can be stored in the system for further analysis. The output aligned volumetric data corresponding to a correction orientation of subject block 706 can be optional in certain embodiments.

Further, in some embodiments, the system can be configured to modify the data according to one or more parameters or metrics at block 709. For example, the data can be modified to resize the voxels. In certain embodiments, the voxels can be resized to isotropic squares of one millimeter in order to balance between sufficiently high resolution and computational speed.

In some embodiments, at block 712, the system can be configured to assess a level of alignment. For example, the system can be configured to utilize correlation and/or coefficient square in order to assess the level of alignment between the now aligned three-dimensional volumetric data and/or resliced two-dimensional slices to the predetermined atlas.

Figure 7A:
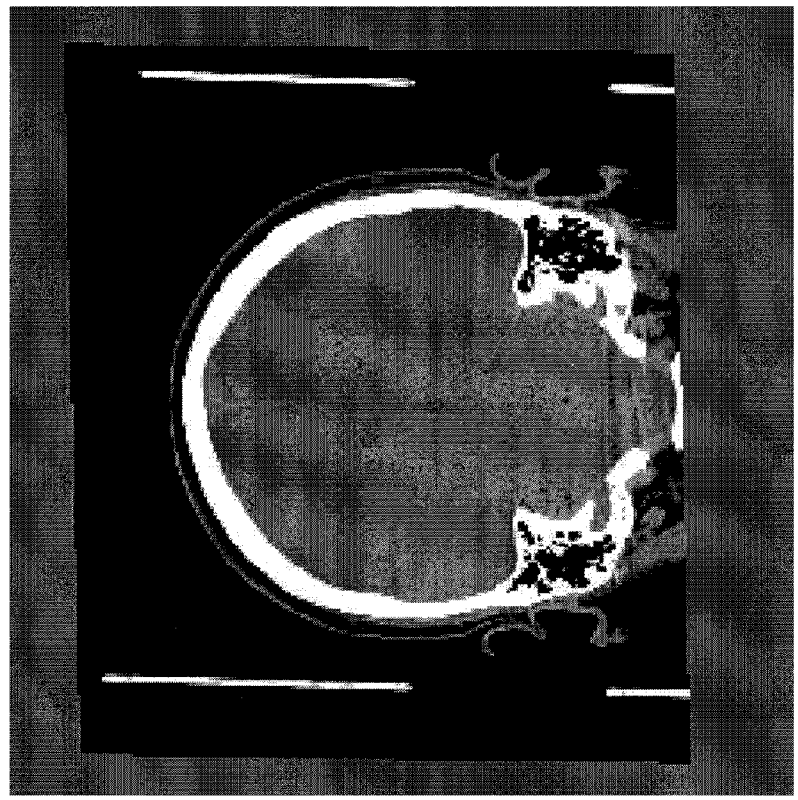
FIG. 7A depicts an example illustrating aligned and resampled data to an atlas.

FIG. 7A illustrates an example of aligned and resampled CT volume of intracranial space of a subject. As illustrated, the aligned and resampled volume can comprise a reconstructed density, or Hounsfield for CT, image or the like.

Determination of Intracranial Peripheral Boundary

Generally, the whole intracranial brain region comprises a periphery intracranial space along the outer boundary of the brain region that is closest to the interior surface of the skull and a central intracranial space inside the periphery intracranial space. The periphery intracranial space can comprise a number of conditions that are particular and/or easier to detect in this region. For example, small differences in hemorrhage can appear clear in the periphery intracranial space compared to other regions of the brain. Accordingly, it can be advantageous to determine and/or segment the periphery intracranial space of a subject.

Further, certain characteristics and/or conditions are particular to the central intracranial space inside the periphery intracranial space. For example, the anterior and posterior ventricles are generally located within the central intracranial space. As such, when analyzing and/or reviewing such characteristics, features and/or conditions that are likely to be found within the central intracranial space, it can be faster and more efficient for a system to focus solely on the interior brain region in the central intracranial space.

Figure 8:
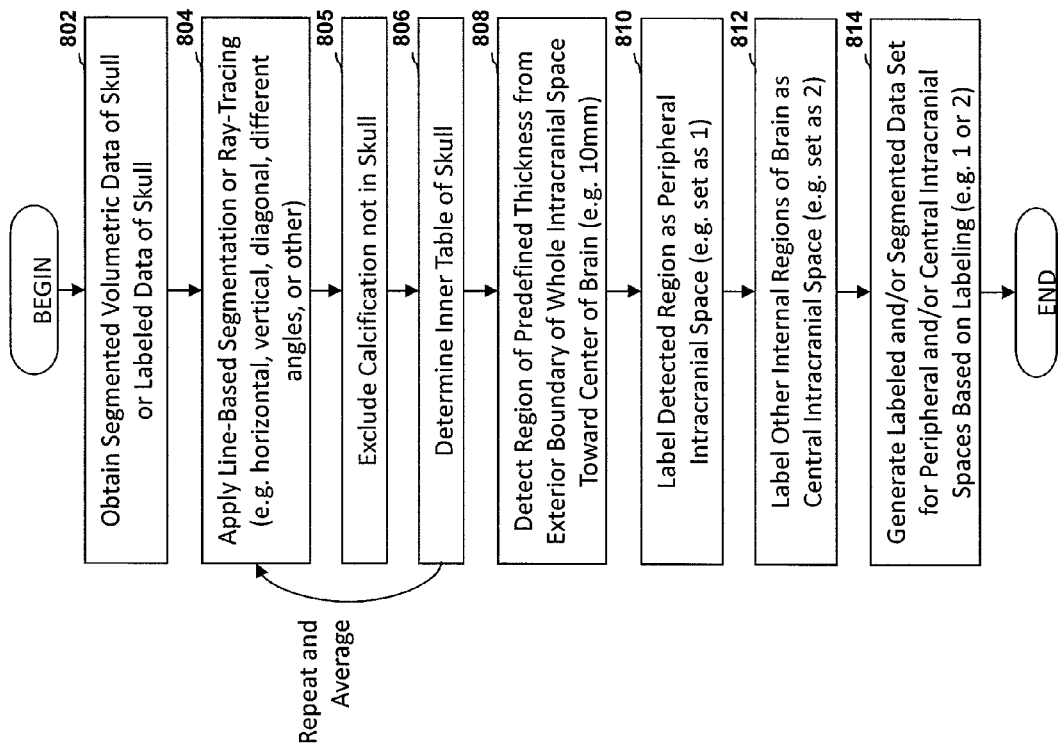
FIG. 8 is a process flow diagram illustrating an example of an embodiment of determining the location and identifying peripheral intracranial space of scanned subject data.

Accordingly, in some embodiments, the system is configured to determine and/or segment the periphery intracranial space. FIG. 8 illustrates and overview of an example of an embodiment of determining the location and identifying a periphery intracranial space of a scanned subject data.

In some embodiments, at block 802, the system is configured to obtain segmented volumetric data of skull or labeled data of skull. In certain embodiments, at block 804, the system can be configured to apply a line-based segmentation process and/or a ray tracing process in order to determine the inner table of skull using either a segmented volumetric data set or labeled data set. For example, the system can be configured to analyze the voxels of the volumetric data along a horizontal line to determine the intensity and/or presence of skull in each voxel along a line. The line along with the system is configured to detect voxel intensities for the line-based segmentation can be horizontal, vertical, diagonal, and/or other orientation. In certain embodiments, the system can be configured to analyze the voxels in a similar manner by applying a ray-tracing process by selecting a point within the central intracranial space and analyzing the voxel intensities along a ray of orthogonal lines radiating from that selected point.

In some embodiments, the system can be configured to detect where a continuous line of voxels with intensities corresponding to skull switches to voxels with intensities corresponding to other tissue or vice versa along a line. The system can be configured to identify voxels with intensities above or a within a certain threshold range. For example, for CT scans, the system can be configured to identify voxels with intensities above about 100 Hounsfield units or higher as skull and voxels with lower intensities as other tissue.

In some embodiments, the system can be configured to exclude calcification that is not part of the skull at block 805. For example, if calcification exists in the central intracranial space, voxels that correspond to that region can appear as skull in the system if those voxels comprise intensities within the predetermined threshold range for skull. However, the system can be configured to further analyze the location of such voxels in order to determine whether a particular voxel is likely to be skull or other intracranial calcification, such as midline calcification. For example, if a particular voxel comprises a high density that is within the predetermined threshold, but is located in the central intracranial region, then the system can be configured to exclude the voxel when determining the peripheral intracranial space.

Based on a line-based segmentation and/or ray tracing, the system can be configured to determine the inner table of the skull at block 806. In certain embodiments, the system can be configured to repeat blocks 804 through 806 in order to obtain a number of determinations of the inner table of skull. For example, initially, the system can be configured to apply a horizontal line-based segmentation in order to determine the inner table of skull. The system can be further configured to apply a vertical or diagonal line-based segmentation in order to determine the inner table of skull. Further, the system can be configured to apply ray-tracing in order to determine the inner table of skull. In some embodiments, the system can be configured to repeat blocks 804 through 806 a number of times, for example 6-8, along varying lines in order to balance efficiency and accuracy. The angle between the varying lines can be about 22.5 degrees in some embodiments. After applying the plurality of processes to determine the inner table of skull, the system can be configured to average or otherwise combine the determined inner table of skull in order to obtain a more accurate configuration of the inner table of skull of the patient.

Based on the determined inner table of skull, the system can be configured to detect a region of predefined thickness from the inner table of skull towards the center of the brain at block 808. This region of predefined thickness from the inner table of skull can be determined to be the periphery intracranial region in some embodiments. For example, the predefined thickness from the inner table of skull towards the center of the brain can be set at about ten millimeters or any other value.

The region of predefined thickness from the inner table of skull towards the center of brain can be labeled as a periphery intracranial boundary region at block 810. For example, in a binary system, the system can be configured to label the detected region as 1. Further, the system can be configured to label the other internal regions of the brain or central periphery region. For example, in a binary system, the system can be configured to label the other internal regions of brain as two.

Based on the labeled periphery intracranial space and/or central intracranial space of the brain, the system can be configured to generate a segmented volumetric and/or labeled data set for the peripheral and/or central intracranial spaces at block 814. Such generated segmented volumetric and/or labeled data can be stored in the system for further processing.

Figure 8B:
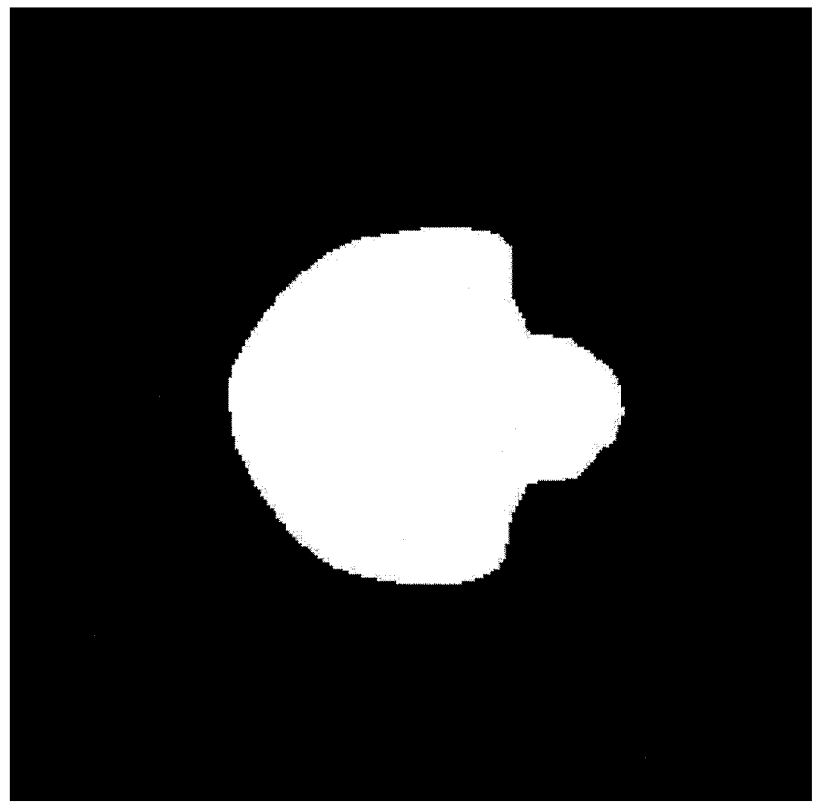
FIG. 8B depicts an example illustrating a labeled data set of central intracranial space.

FIG. 8A illustrates an example of a labeled data set of peripheral intracranial space. As illustrated, only the peripheral intracranial space of predetermined thickness from the inner table of skull is highlighted. FIG. 8B illustrates an example of a labeled data set of central intracranial space. As illustrated, only the central intracranial space that is located within the periphery intracranial space is highlighted.

Computation and Adjustment of Brain Volume

Some patients can have a brain volume that varies from the normative data set and/or atlas. As such, a direct comparison of one or more metrics between a medical scan and normative data may not be accurate without taking into account the variances in brain volume. As such, it can be advantageous to compute the brain volume of the subject patient at interest to compare to the brain volume of the normative data set.

Figure 9:
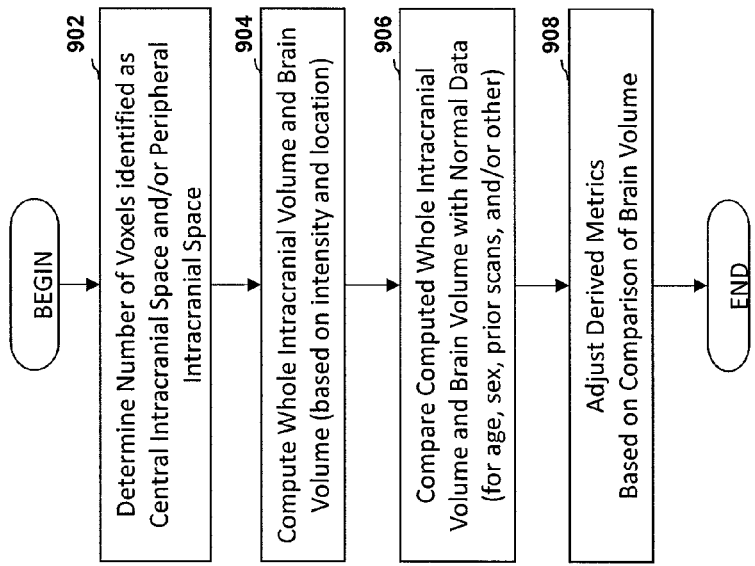
FIG. 9 is a process flow diagram illustrating an example of an embodiment of determining the volume of a brain of a scanned subject.

Accordingly, in some embodiments, the system is configured to compute and compare the brain volume of a subject patient of interest to a normative volume. FIG. 9 illustrates an example of an embodiment of determining the volume of a brain of a scanned subject.

In some embodiments, at block 902, the system is configured to determine the number of voxels of a complete volumetric data set of a particular patient that are identified as the whole intracranial space, central and/or peripheral intracranial space. Based on the determined number of voxels, the system can be configured to compute a volume of the whole intracranial volume of the subject patient based on voxel density and/or location at block 904.

The system in certain embodiments can be configured to compare the computed volume of the whole intracranial space of the subject patient to that of a normative data. For example, the system can be configured to compare the whole brain volume of a subject with that of normal control subjects of a particular age group and/or sex. Also, the system can be configured to compare the whole brain volume of a subject with that of prior measurements from earlier scans.

Based on the comparison, the system can be configured to utilize the variance in brain volume to normative data and/or prior scans to adjust one or more derived metrics at block 908. For example, the variance in brain volumes can be taken into account by the system when comparing total blood volume, fat percentage, and/or other metrics between a particular scan and normative data and/or prior scans.

Identification of Ventricles

Generally, the location of the lateral ventricles in the brain of a subject patient can be indicative of one or more conditions of the particular patient. For example, if the brain of a patient comprises hemorrhage, the lateral ventricles can be shifted to the left and/or right hemispheres of the brain from its usual central location within the brain. This is generally because the lateral ventricles comprise spinal fluid inside the middle of the brain and are symmetrical in normal subjects. When there is hemorrhage in one side of the brain of a subject patient, the lateral ventricles can be displaced to the other side of the brain because it is a fixed volume. As such, it can be advantageous to identify the location of the anterior and/or posterior ventricles within the brain of a subject patient.

Figure 10:
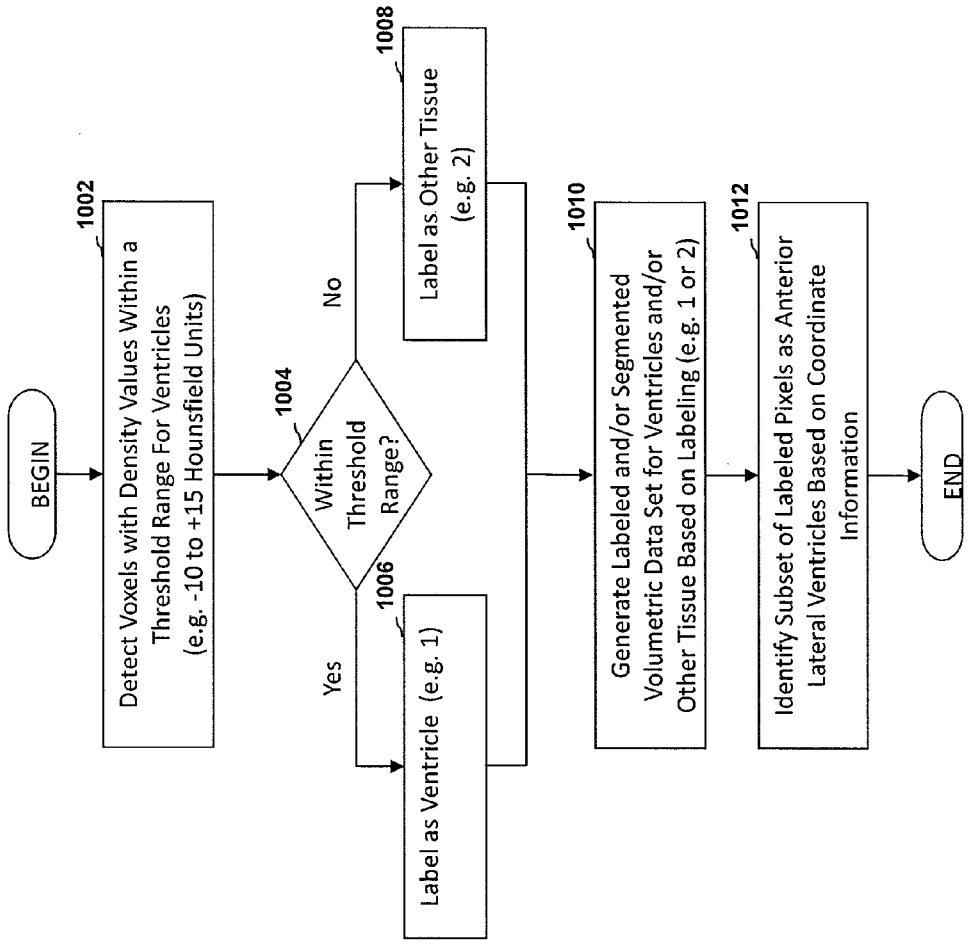
FIG. 10 is a process flow diagram illustrating an example of an embodiment of identifying the location of ventricles in scanned subject data.

Accordingly, in some embodiments, the system is configured to identify a location of ventricles within the brain of a subject patient. FIG. 10 represents an overview of an embodiment of identifying the location of ventricles in scanned subject data.

In some embodiments, at block 1002, the system is configured to detect voxels with intensity or density values within a range of threshold values for ventricles. The range of threshold values for ventricles can be predetermined and stored in the system. In some embodiments, the range of threshold values for ventricles can be dependent on the type of modality scanner, manufacturer of a particular modality scanner and/or age group. For example, in some embodiments for a CT scanner, the range of threshold values for ventricles can be predefined as between −10 to +15 Hounsfield units. In such embodiments, any voxels with intensity values within this range can be determined by the system to correspond to ventricles.

In certain embodiments, the system can be configured to determine whether a particular voxel comprises an intensity value within the predetermined range of threshold values for ventricles at block 1004. If a particular voxel comprises an intensity value within the range, the system can be configured to label that particular voxel as corresponding to a ventricle. For example, in a binary processing system, the system can be configured to label such voxels as one. Alternatively, if a voxel does not comprise an intensity value within the preset range of threshold values, the system can be configured to label that particular voxel as other tissue. For example, in a binary processing system, the system can be configured to label such voxels as zero.

Based on the labeling, in some embodiments, the system can be configured to generate a labeled and/or segmented volumetric data set for ventricles and/or other tissue based on the labeling at block 1010. The generated labeled and/or segmented volumetric data set of ventricles and/or other tissue can be stored in the system for further processing.

In certain embodiments, the system is configured to identify a subset of the labeled and/or segmented data as anterior lateral ventricles. For example, in some embodiments, the system is configured to utilize atlas coordinate information, such as x, y, z voxel locations in the atlas to identify voxels that correspond to anterior lateral ventricles. In some embodiments, because the brain region is aligned to the atlas and/or re-sliced, x, y, z voxel locations in the volumetric data correspond to the x, y, z voxel locations in the atlas.

Ventricular Analysis

As generally discussed above, the anterior lateral ventricles can be shifted in some subject patients. The shifting of the anterior lateral ventricles can be indicative of particular conditions and/or diseases. For example, if there is hemorrhage on one side of the brain, the anterior lateral ventricles can be shifted to the other side of the brain. As such, it can be advantageous to determine a shift of the midline of anterior lateral ventricles in order to efficiently determine whether the scan data set of the subject requires time sensitive analysis.

Figure 11:
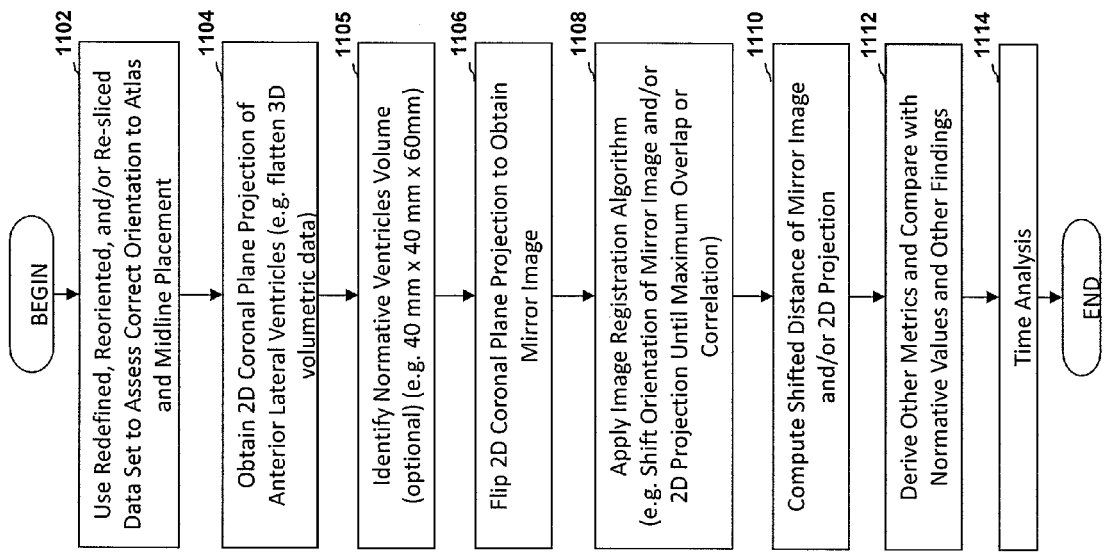
FIG. 11 is a process flow diagram illustrating an example of an embodiment of determining a midline shift of scanned subject data.

Accordingly, in some embodiments, the system is configured to determine a level of midline shift in a scanned data set obtained from a subject patient by conducting a ventricular analysis. FIG. 11 illustrates an overview of an example of an embodiment of determining a midline shift or otherwise analyzing ventricles of scanned subject data.

In some embodiments, the system is configured to assess whether the orientation of a scanned data set to an atlas is correct at block 1102. The scanned data set can be redefined, reoriented, and/or re-sliced from the original raw data and/or reconstructed image data received from a modality scanner. Further, the system can be configured to determine whether the midline of the scanned data is oriented properly such that it is along the 0 axis in the redefined coordinate system in some embodiments.

In certain embodiments, if the orientation and/or alignment is satisfactory or above a predetermined threshold, the system is configured to obtain a two-dimensional coronal plane projection of the anterior lateral ventricles in the scan subject data at block 1102. For example, the system can be configured to flatten the three-dimensional volumetric data in order to obtain a two-dimensional coronal plane projection of the ventricles. It can be advantageous to identify and/or determine the midline shift on a two-dimensional image rather than in three-dimensional volumetric data in order to minimize the processing time and capacity. For example, in some embodiments, the system can be configured to determine the midline shift in about ten seconds because the system only needs to analyze a one-dimensional translation instead of a three-dimensional translation and rotation.

In some embodiments, at block 1105, the system is configured to identify a normative ventricles region in a scanned subject data. For example, generally, the anterior and/or posterior ventricles are located at substantially the center of a brain with some variance. By studying a plurality of normal control subjects, the system can be configured to store a predefined normative ventricles region. For example, in some embodiments, the normative ventricles region is predefined as a three-dimensional region in the center of the brain that is 40 mm×40 mm×60 mm.

In certain embodiments, at block 1106, the system can be configured to flip the obtained two-dimensional coronal projection of the anterior lateral ventricles to obtain a mirror image. At block 1108, in certain embodiments, the system can be configured to apply one or more image registration algorithms to the original two-dimensional coronal plane projection of the anterior lateral ventricles and/or the flipped two-dimensional coronal plane projection. For example, the system can be configured to shift the orientation of the mirror image and only, the original two-dimensional projection only, and/or both until the system obtains a maximum overlap or correlation between the original two-dimensional coronal plane projection and the flipped mirror image.

At block 1110, in some embodiments, the system can be configured to compute the shifted distance of the mirror image and/or original two-dimensional projection, for example in millimeters. In embodiments where the system shifted only one of the original two-dimensional projection or mirror image, the system can be configured to compute the total shifted distance and divide the computed distance by two. Alternatively, in embodiments where both the original two-dimensional projection and the mirror image were shifted, the shifted distance does not need to be divided by two to obtain a midline shift.

At block 1112, in certain embodiments, the system can be configured to derive one or more other metrics relating to the ventricles and compare them to normative values and/or other findings. For example, the system can be configured to determine and/or compare the shape, configuration, volume, or the like of the ventricles.

In some embodiments, the system is configured to conduct one or more time comparisons of the ventricular analyses at block 1114. For example, the system can be configured to conduct a comparison between one or more ventricular analyses that conducted on a single patient separated by time after reorienting the scans to the atlas. Further, the system can be configured to conduct an analysis of sequential scans with and without IV contrast, as the IV contrast can change the density of perfused tissue, so acute stroke will not change the density similar to normal tissue will.

In addition, in some embodiments, the system can be configured to compare two or more reoriented scans of the same patient separated by time and apply an interval change overlay. For example, the system can be configured to subtract the density of an earlier scan from a later scan, thereby producing a subtraction image series that can better highlight non-uniform changes over time.

Data Calculation & Analysis

In order to efficiently and effectively conduct an initial review and/or analysis of scanned medical data, it can be advantageous to compare one or more predetermined parameters and/or characteristics of the scanned subject data to one or more normative values. If a discrepancy between the one or more parameters and/or factors of the scanned subject data and the normative data is beyond a particular threshold, it can be said that there is a highly likelihood that the subject patient requires time sensitive diagnosis and/or further review.

Accordingly, in some embodiments, the system is configured to calculate one or more data sets and/or parameters and further analyze such data sets and/or parameters. FIG. 12 illustrates an overview of an example of an embodiment of calculating and analyzing scanned subject data.

At block 1202, in some embodiments, the system can be configured to identify a particular region for analysis in a subject patient in a subject scan data. For example, the particular region can be the whole intracranial space, peripheral intracranial space, central intracranial space, posterior fossa, or the like.

At block 1204, in certain embodiments, the system can be configured to determine a normative data set to apply for comparison. For example, the normative data set can be a particular normative data set based on the age group and/or sex of the subject patient, type of modality scanner, manufacturer of a particular type of scanner, or other metric.

In some embodiments, at block 1206, the system can be configured to classify one or more voxels of the scanned data set by density range, region, and/or normative data. For example, the system can be configured to classify voxels of a scanned data set according to one or more density ranges that correspond to skull, brain tissue, anterior and/or posterior ventricles, and/or other tissue. Further, the system can be configured to classify voxels of a scanned data set according to one or more regions or locations, such as the peripheral and/or central intracranial space, or the like. In addition, the system can be configured to classify voxels of a scanned data set according to any other normative data and/or parameter.

In certain embodiments, at block 1208, the system can be configured to compute and/or compare a percentage of voxels in the scanned subject data by density range. For example, the system can be configured to computer and/or compare voxels with density values within a particular range that can correspond to a particular tissue.

In some embodiments, at block 1210, the system is configured to compare a percentage of voxels with density values within a particular range in the left and right hemispheres of the subject brain. For example, the system can be configured to compare the percentage of voxels with density values within a particular range in the left and right sides of the whole, peripheral, and/or central intracranial spaces.

In certain embodiments, at block 1212, the system can be configured to compute a standard deviation and/or Z score of the scanned data set from the normative data. The Z score can be defined as the number of standard deviations of a particular metric and/or characteristic of the scanned subject data from normative data. For example, the standard deviation and/or Z score can be computed for the whole, central, and/or peripheral intracranial space volume, percentage of voxels within a particular density range, region, and/or other normative data. At block 1214, in some embodiments, the system can be configured to compare the computed standard deviation and/or Z score to an acceptable range of deviation, left/right symmetry, and/or other parameters.

In some embodiments, at block 1215, the system is configured to conduct one or more time comparisons of the data analyses of blocks 1208-1214. For example, the system can be configured to conduct a comparison between one or more data analyses that conducted on a single patient separated by time after reorienting the scans to the atlas. Further, the system can be configured to conduct an analysis of sequential scans with and without IV contrast, as the IV contrast can change the density of perfused tissue, such that tissue suffering acute stroke will not change in density as normal tissue will.

In addition, in some embodiments, the system can be configured to compare two or more reoriented scans of the same patient separated by time and apply an interval change overlay. For example, the system can be configured to subtract the density of an earlier scan from a later scan, thereby producing a subtraction image series that can better highlight non-uniform changes over time.

Based on one or more computed data and/or comparisons in blocks 1208 through 1214 and/or optional time analysis of block 1215, the system can be configured to determine whether the one or more comparisons satisfy a threshold level at block 1216. If the one or more comparisons satisfy a threshold level, the system can be configured to determine whether the discrepancy between the scanned subject data and normative data, between the left and right sides of the subject data, and/or other parameter are acceptable for the age group and/or sex of the subject patient, the type of scanner, manufacturer of scanner, or the like at block 1218. Block 1218 can be optional in certain embodiments. If the system detects that a discrepancy is not acceptable, the system can be configured to indicate the data as abnormal at block 1220.

Based on the analysis and/or determinations made in blocks 1216 through 1220, the system can be configured to generate and output a report at block 1222. The report can comprise one or more histograms and/or data tables. Block 1222 can be optional in certain embodiments.

Queue Analysis

As generally discussed above, some medical scans are more time sensitive than others and can require immediate and/or faster review and/or diagnosis by a medical professional. Accordingly, it can be advantageous to use one or more data analyses and/or methods of described herein in order to determine which medical scans require more immediate attention than others.

Figure 13A:
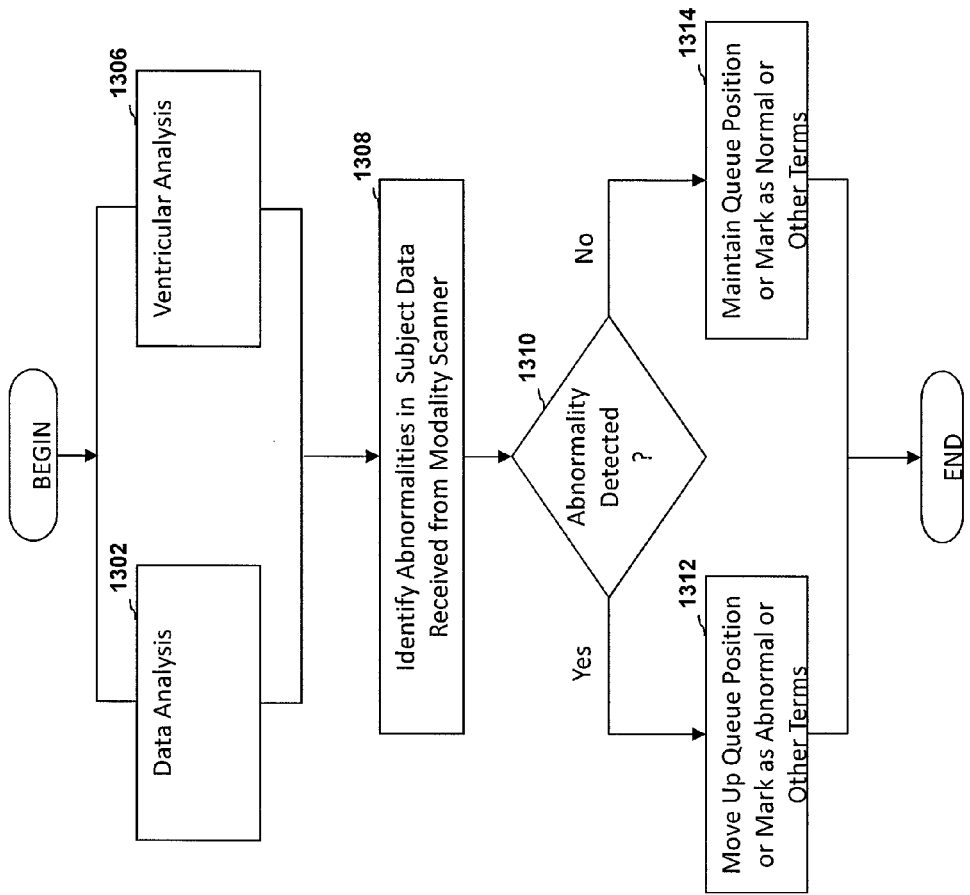
FIG. 13A is a process flow diagram illustrating an example of an embodiment of determining an appropriate queue of scanned subject data.

As such, in some embodiments, the system is configured to conduct a queue analysis in order to determine an appropriate queue position of a medical scan. FIG. 13A illustrates an overview of an example of an embodiment of determining an appropriate queue of a medical scan.

As discussed above, the system can be configured to conduct one or more data analyses at block 1302 and/or ventricular analyses at block 1306. Based on one or more of such analyses, determinations, and/or identifications, the system can be configured to identify abnormalities in the medical scan case received from one or more modality scanners at block 1308.

In certain embodiments, the system can be configured to determine whether one or more abnormalities are detected in the subject data set at block 1310. If the system determines that an abnormality is detected, the system can be configured to move up the queue position of the medical scan case and/or mark the medical scan as abnormal, time-sensitive, and/or any other description such that a medical professional can further review and/or diagnose the medical scan case before other cases at block 1312. Alternatively, if the system determines that no abnormality is detected, the system can be configured to maintain the queue position of the medical scan case and/or label the medical scan case as not time sensitive, normal, and/or other description such that a medical professional can review and/or diagnose the medical scan case after other cases at block 1314.

Figure 13B:
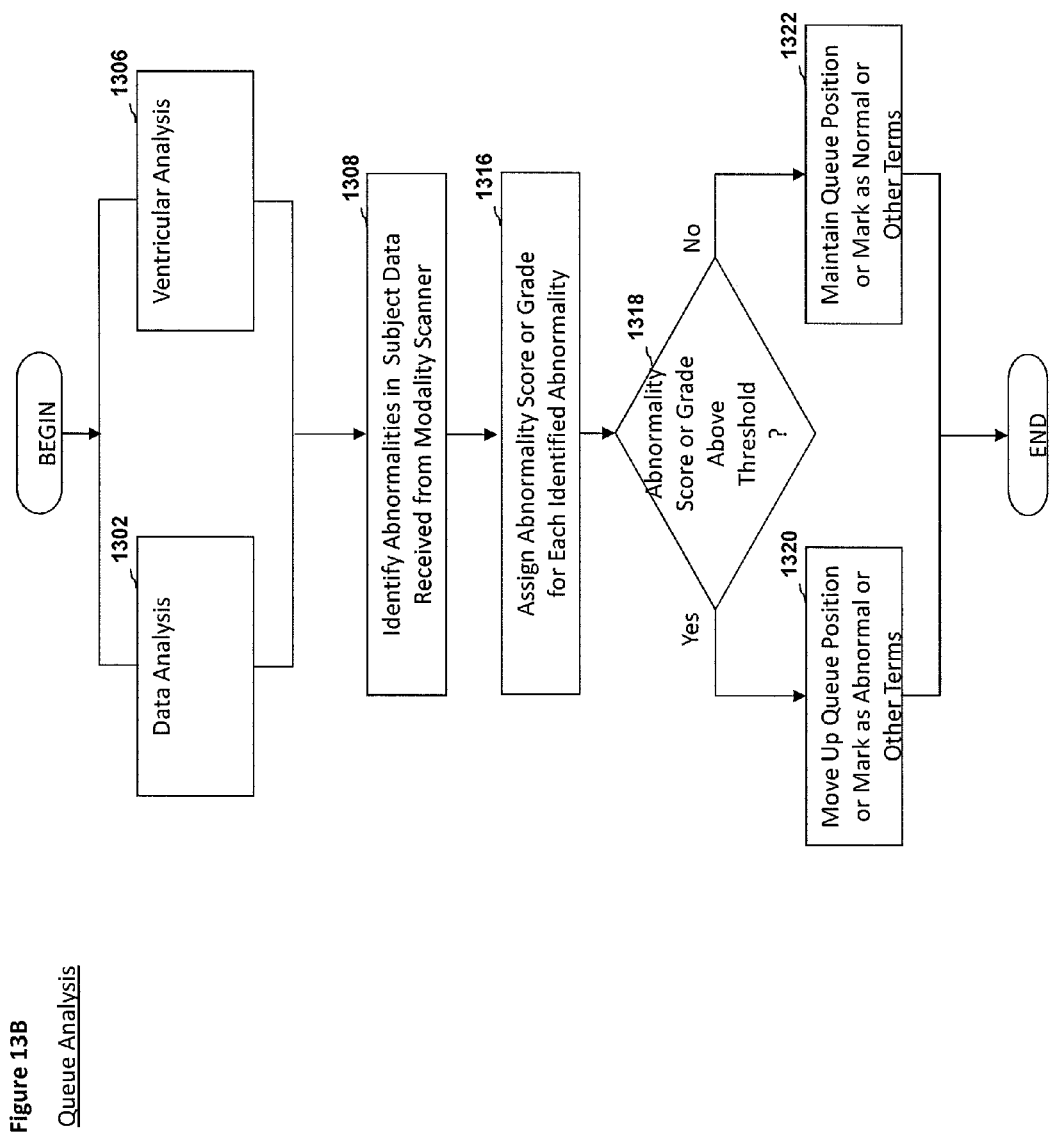
FIG. 13B is a process flow diagram illustrating another example of an embodiment of determining an appropriate queue of scanned subject data.

FIG. 13B illustrates an overview of another example of an embodiment of determining an appropriate queue of medical scans. Similar to FIG. 13A, the system can be configured to conduct one or more of data analyses at block 1302 and/or ventricular analyses at block 1306. Based on one or more of the analyses, the system can be configured to identify abnormalities in the medical scan case received from one or more modality scanners at block 1308.

In some embodiments, the system can be configured to assign an abnormality score and/or grade for each identified abnormality at block 1316. For example, the system can be configured to compare and assign a score to one or more identified abnormalities in the subject data to a normative data set and/or allowable discrepancy thresholds from the normative data set based on the age group and/or sex of the subject patient, type of modality scanner, and/or manufacturer of a particular type of modality scanner.

At block 1318, in some embodiments, the system can be configured to determine whether the abnormality score and/or grade is above a predetermined threshold. If the system determines that the abnormality score and/or grade is above a predetermined threshold, the system can be determined to move up the queue position of the medical scan and/or label the scanned data set as time sensitive, abnormal, or other description such that a medical professional can be prompted to review the medical scan first at block 1320. Alternatively, if the system determines that the abnormality score and/or grade is below the predetermined threshold, the system can be configured to maintain the queue position of the medical scan and/or label the scanned subject data as not time sensitive, normal, and/or other description in order to allow a medical professional to review the medical after other cases at block 1322.

Figure 13C:
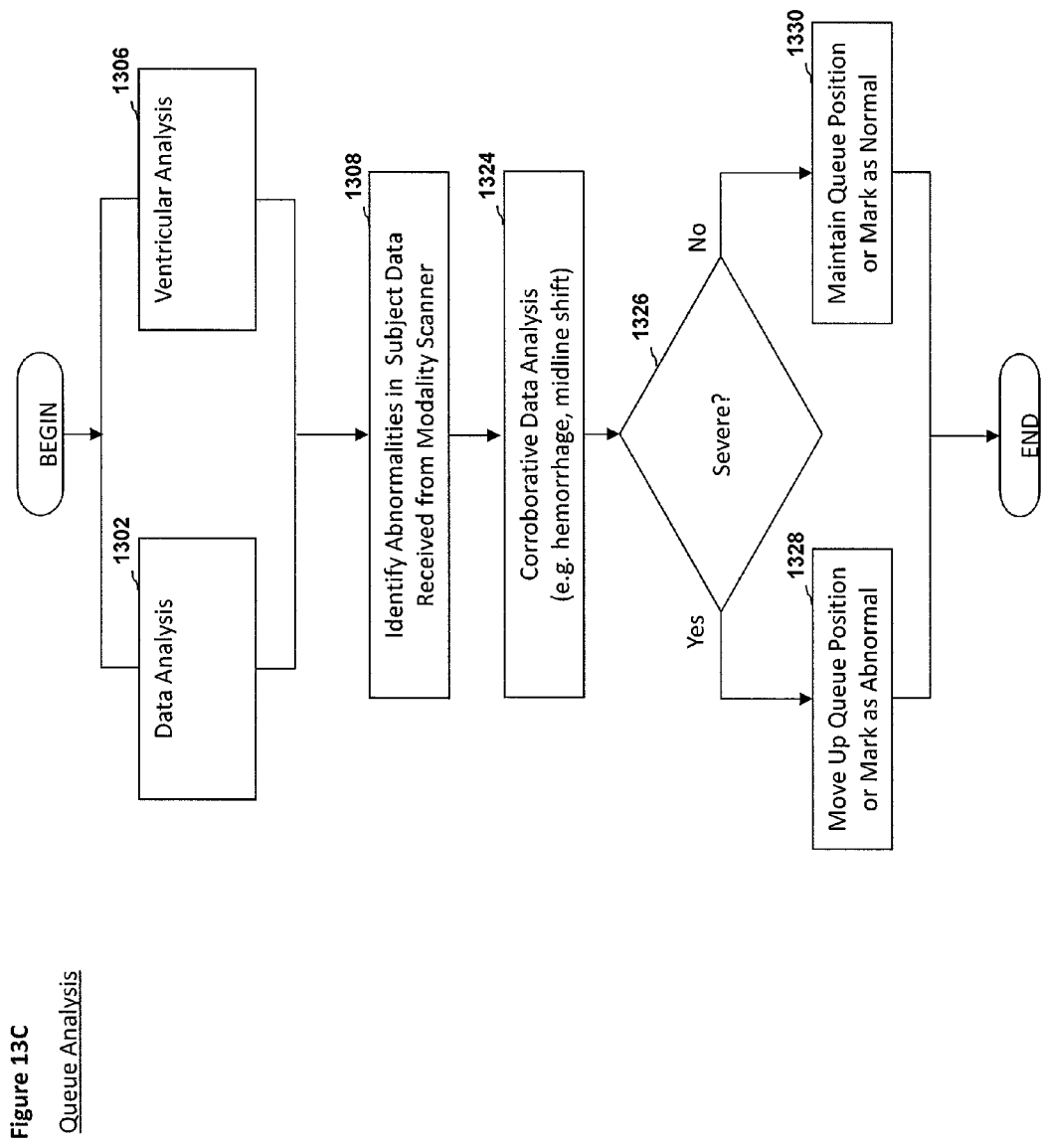
FIG. 13C is a process flow diagram illustrating another example of an embodiment of determining an appropriate queue of scanned subject data.

FIG. 13C illustrates an overview of another example of an embodiment of determining an appropriate queue of medical scans. In some embodiments, the system can be configured to conduct a corroborative data analysis at block 1324. For example, the system can be configured to detect whether the medical scan case comprises hemorrhage, midline shift, and/or other abnormalities.

At block 1326, in some embodiments, the system can be configured to determine whether a result of one or more corroborative data analyses is severe beyond a predetermined threshold. If the system determines that a result of one or more corroborative data analyses is above a predetermined threshold, the system can be determined to move up the queue position of the medical scan and/or label the medical scan as time sensitive, abnormal, hemorrhage, midline shift, or other description such that a medical professional can be prompted to review the medical scan before others at block 1328. Alternatively, if the system determines that a result of one or more corroborative data analyses is below the predetermined threshold, the system can be configured to maintain the queue position of the medical scan and/or label the medical scan as not time sensitive, normal, mild case of hemorrhage, mild case of midline shift, or other description in order to allow a medical professional to review the medical scan after the more time-sensitive cases at block 1330.

Quality Assurance & Teaching Tool

Some medical professionals can make mistakes in reviewing one or more medical scans received from one or more modality scanners. For example, a medical professional may decide that a particular subject data set is normal or healthy when in fact the medical scan set shows signs of abnormalities. Alternatively, a medical professional may decide that a particular medical scan is abnormal when in fact the medical scan set is healthy or normal. As such, it can be advantageous to provide a system for determining a level of quality assurance of one or more medical professionals. Further, it can be advantageous to provide a teaching tool to medical professionals in order to train their skills in reviewing scanned subject data from one or more modality scanners and to identify one or more abnormalities therein.

Figure 14:
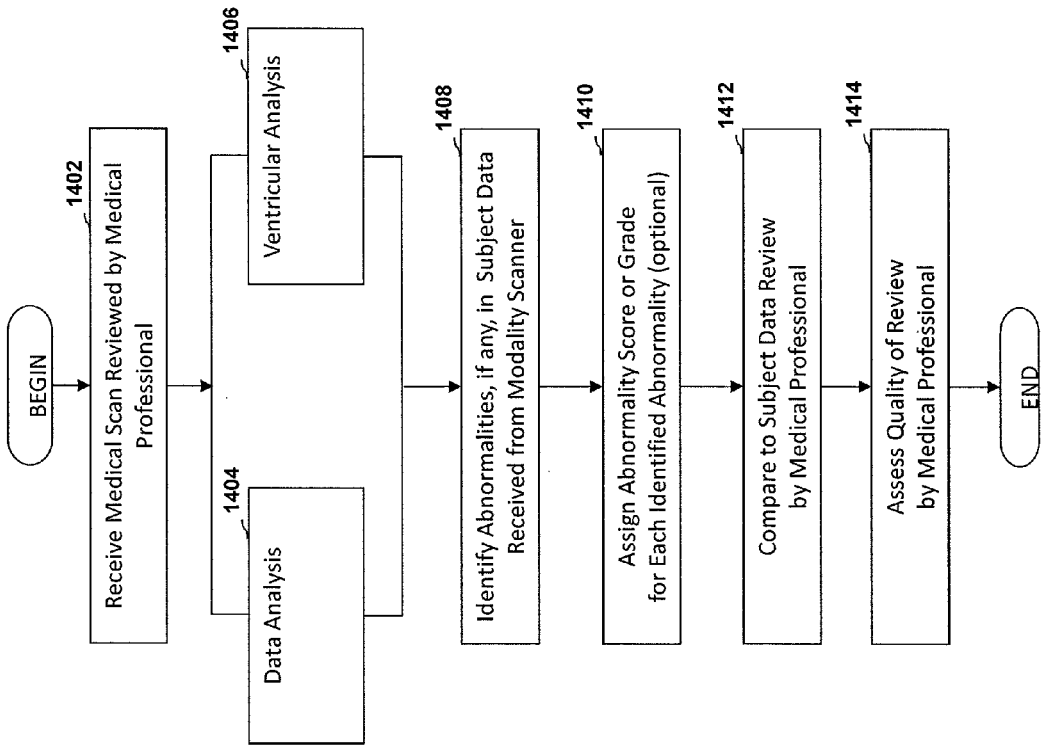
FIG. 14 is a process flow diagram illustrating an example of an embodiment of using automated analysis of medical scans for quality assurance and/or a teaching tool for medical professionals.

Accordingly, in some embodiments, the system comprises methods for determining quality assurance of medical professionals and/or providing a teaching tool for medical professionals. FIG. 14 illustrates an overview of an example of an embodiment of using automated analysis of medical scans for quality assurance and/or a teaching tool.

In some embodiments, the system can be configured to receive one or more medical scan cases reviewed by a medical professional at block 1402. The one or more medical scan cases can comprise one or more abnormalities that were correctly and/or incorrectly detected by a medical professional. The one or more medical scan cases can also comprise faulty diagnosis of an abnormality by a medical professional when in fact the medical scan case is normal in that aspect.

In some embodiments, the system can be configured to conduct one or more data analyses at block 1404 and/or ventricular analyses at block 1406. Based on the data analyses and/or ventricular analyses, the system can be configured to identify one or more abnormalities in the scanned subject data set received from one or more modality scanners at block 1408. In certain embodiments, the system can further be configured to assign an abnormality score and/or grade for each identified abnormality at block 1410. Block 1410 can be optional in some embodiments.

At block 1412, in certain embodiments, the system can be configured to compare the system generated analysis of the scanned subject data to the review of the scanned subject data performed by a medical professional. For example, in some situations, the system can identify a particular abnormality and/or severity thereof in a scanned subject data while the medical professional did not identify that abnormality or data identified but assigned a lower severity score. Alternatively, in certain situations, the system can decide that the subject scan data is normal or healthy while a particular medical professional decided that the scanned subject data comprised one or more abnormalities.

Based on such comparison, at block 1414, the system can be configured to assess the quality of review by one or more medical professionals. Further, the comparison of scanned subject data review by the system and by a medical professional can be used as a teaching tool for medical professionals as well.

Data Analysis Examples

As discussed above, the system can be configured to optionally generate one or more histograms of a scanned subject data set for further analysis. For example, a histogram or a continuous histogram of number of voxels versus density can be plotted on a graph for further analysis.

Figure 15A:
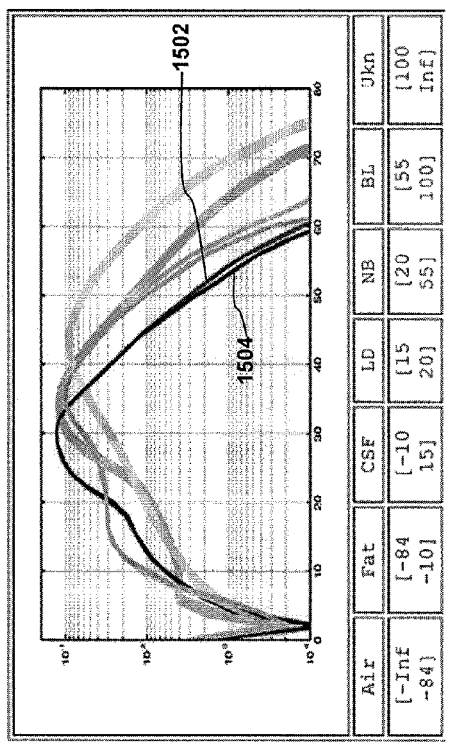
FIGS. 15A-15B depict examples illustrating histograms of healthy and unhealthy subjects.
Figure 15B:
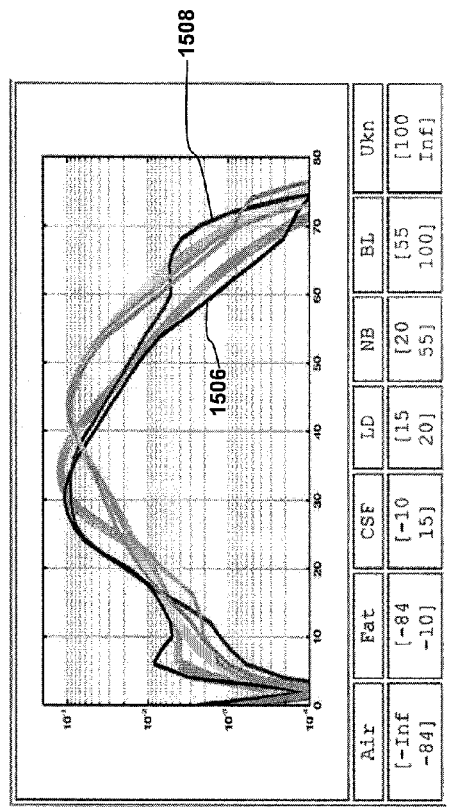

FIGS. 15A and 15B illustrate examples of histograms of healthy and unhealthy subjects that can be optionally generated by the system. More specifically, FIG. 15A illustrates a histogram generated by the system of a healthy subject. Further, FIG. 15B illustrates an example of a histogram generated by the system of an unhealthy subject.

As illustrated in FIGS. 15A and 15B, one or more histograms can be generated for a number of parameters and/or characteristics. For example, a histogram can be generated for the voxels in the left and/or right sides of a brain of a subject. In some embodiments, the generated histograms are semi-logarithmic and are not linear. As illustrated in FIG. 15A, a histogram 1502 generated for the voxels in the right hemisphere of a brain of a subject is substantially similar and/or is substantially overlapping or matching with the histogram 1504 generated for voxels in the left hemisphere of the brain of the subject. This overlap of the histograms 1502, 1504 suggests and/or indicates that the left and right hemispheres of the subject brain are likely to be symmetrical and therefore healthy. In contrast, in FIG. 15B, the histogram 1506 generated for voxels in the left hemisphere of a brain and the histogram 1508 generated for voxels in the right hemisphere of the brain are not substantially similar and/or overlapping or matching. The difference in histograms 1506, 1508 suggests and/or indicates an asymmetry between the left and right hemispheres of the subject brain and therefore that the subject brain is unhealthy and/or comprises one or more abnormalities. In some embodiments, the computer system can be configured to analyze the one or more histograms and/or the underlying values of the left and/or right hemispheres of the subject brain in order to automatically determine the level of matching and/or overlapping between the histograms and/or underlying data. In some embodiments, the computer system can be configured to subtract the right from the left histogram or vice versa (or the log of the percentages, as in the figure) and then multiply the difference, by a specific factor for each unit of density, attaching greater weight to some densities than others and negative factor for some densities. Based on determining the level of matching and/or overlapping, the system can be configured to output a grade, score, flag, and/or other description for the medical scan case.

Figures 16A, 16B:
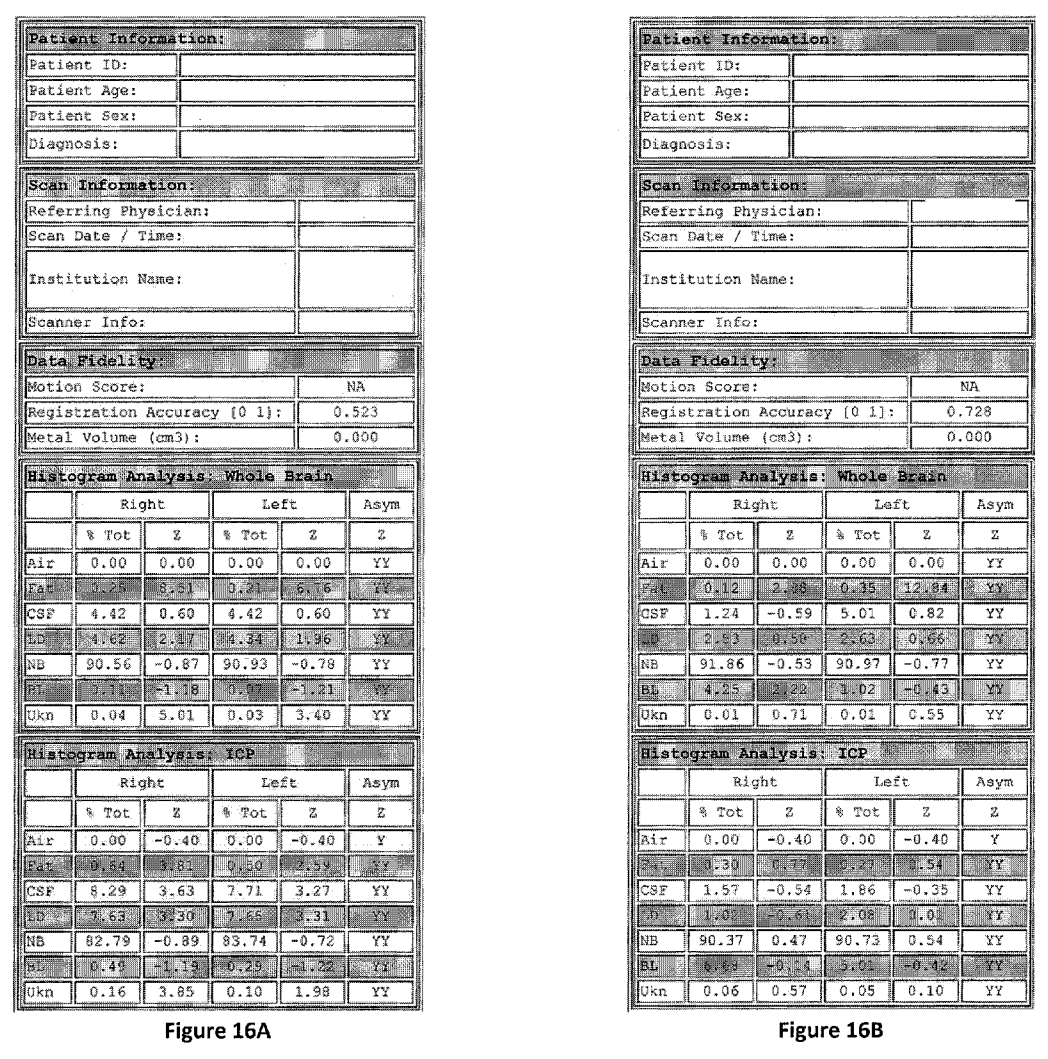

Further, in some embodiments, the system can be configured to optionally generate one or more data charts for further analysis of the scanned subject data. FIGS. 16A and 16B illustrate examples of data charts generated by the system of healthy and unhealthy subjects for automated analysis of medical scans. More specifically, FIG. 16A is an example of data charts generated by the system of a healthy subject. FIG. 16B is an example of data charts generated by the system of an unhealthy subject.

As illustrated in FIGS. 16A and 16B, the system can be configured to generate one or more data charts of voxels or percentages thereof with density values within a particular range and within a particular region of a brain. For example, the system can be configured to determine a percentage of voxels in a scanned data set with density values within a range that corresponds to ventricles and is located in the left and/or right hemispheres of the brain.

Further, the system can be configured to compute a standard deviation or one or more parameters from normative data and/or a Z score. Based on such computed data, the system can be configured to determine whether the one or more parameters of a scanned data set vary from normative data beyond a predetermined threshold. If the system determines that the discrepancy between the scanned subject data and normative data of a particular parameter is beyond the predetermined threshold, the system can be configured to determine that the scanned subject data comprises one or more abnormalities and further change the queue position and/or label the scanned subject data as requiring immediate attention by a medical professional.

FIGS. 17A and 17B illustrate another set of examples of data charts of healthy and unhealthy subjects. More specifically, FIG. 17A illustrates an example of data charts generated for a healthy subject. FIG. 17B illustrates an example of data charts generated for an unhealthy subject.

As illustrated in FIGS. 17A and 17B, the system can be configured to compute a distance of midline shift. The system can further be configured to determine an accuracy of the midline shift determination and/or asymmetry due to the midline shift. Based on such computations, the system can be configured to determine that a particular scanned subject data requires immediate attention by a medical professional if one or more of such computations exceeds a predetermined threshold.

Further, as illustrated in FIGS. 17A and 17B, the system can be configured to compute a severity score of a particular scanned subject data. In determining a severity score, the system can be configured to factor in the age of the patient. Based on the computed severity score, the system can be configured to determine that the scanned subject data requires immediate attention by a medical professional if the severity score exceeds a predetermined threshold.

Computing System

Figure 18:
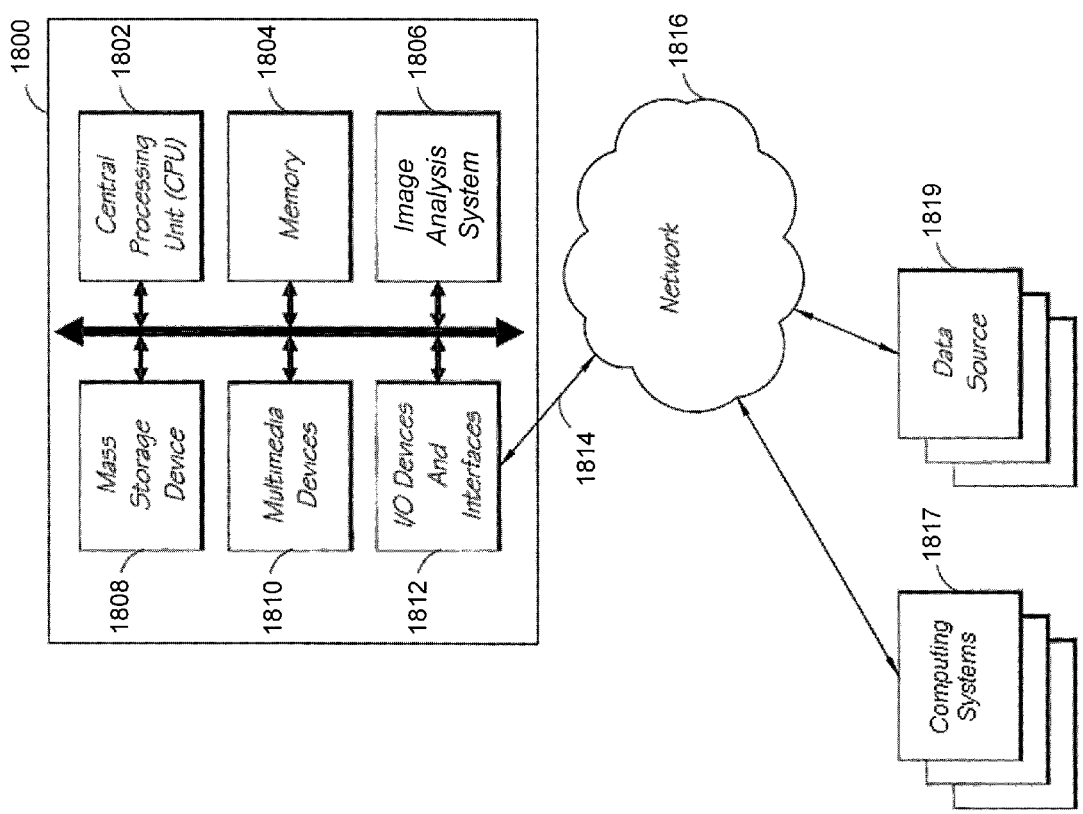
FIG. 18 is a block diagram depicting one embodiment of a computer hardware system configured to run software for implementing one or more embodiments of a system for automated analysis of medical scans described herein.

In some embodiments, the computer clients and/or servers described above take the form of a computing system 1800 illustrated in FIG. 18, which is a block diagram of one embodiment of a computing system that is in communication with one or more computing systems 1817 and/or one or more data sources 1819 via one or more networks 1816. The computing system 1800 may be used to implement one or more of the systems and methods described herein. In addition, in one embodiment, the computing system 1800 may be configured to apply one or more of the automated medical image analysis techniques described herein. While FIG. 18 illustrates one embodiment of a computing system 1800, it is recognized that the functionality provided for in the components and modules of computing system 1800 may be combined into fewer components and modules or further separated into additional components and modules.

Image Analysis System

In one embodiment, the system 1800 comprises an image analysis system 1806 that carries out the functions described herein with reference to analyzing one or more medical scans, including any one of the automated medical scan analysis techniques described above. The image analysis system 1806 may be executed on the computing system 1800 by a central processing unit 1802 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 1800 also comprises a mainframe computer suitable for controlling and/or communicating with large databases, performing high volume transaction processing, and generating reports from large databases. The computing system 1800 also comprises a central processing unit ("CPU") 1802, which may comprise a conventional microprocessor. The computing system 1800 further comprises a memory 1804, such as random access memory ("RAM") for temporary storage of information and/or a read only memory ("ROM") for permanent storage of information, and a mass storage device 1808, such as a hard drive, diskette, or optical media storage device. Typically, the modules of the computing system 1800 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1800 comprises one or more commonly available input/output (I/O) devices and interfaces 1812, such as a keyboard, mouse, touchpad, and printer. In one embodiment, the I/O devices and interfaces 1812 comprise one or more display devices, such as a monitor, that allows the visual presentation of data to a user. More particularly, a display device provides for the presentation of GUIs, application software data, and multimedia presentations, for example. In the embodiment of FIG. 18, the I/O devices and interfaces 1812 also provide a communications interface to various external devices. The computing system 1800 may also comprise one or more multimedia devices 1810, such as speakers, video cards, graphics accelerators, and microphones, for example.

Computing System Device/Operating System

The computing system 1800 may run on a variety of computing devices, such as, for example, a server, a Windows server, an Structure Query Language server, a Unix server, a personal computer, a mainframe computer, a laptop computer, a cell phone, a personal digital assistant, a kiosk, an audio player, and so forth. The computing system 1800 is generally controlled and coordinated by operating system software, such as z/OS, Windows 95, Windows 98, Windows NT, Windows 2000, Windows XP, Windows Vista, Windows 7, Linux, BSD, SunOS, Solaris, or other compatible operating systems. In Macintosh systems, the operating system may be any available operating system, such as MAC OS X. In other embodiments, the computing system 1800 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 18, the computing system 1800 is coupled to a network 1816, such as a LAN, WAN, or the Internet, for example, via a wired, wireless, or combination of wired and wireless, communication link 1814. The network 1816 communicates with various computing devices and/or other electronic devices via wired or wireless communication links. In the embodiment of FIG. 18, the network 1816 is communicating with one or more computing systems 1817 and/or one or more data sources 1819.

Access to the image analysis system 1806 of the computer system 1800 by computing systems 1817 and/or by data sources 1819 may be through a web-enabled user access point such as the computing systems' 1817 or data source's 1819 personal computer, cellular phone, laptop, or other device capable of connecting to the network 1816. Such a device may have a browser module is implemented as a module that uses text, graphics, audio, video, and other media to present data and to allow interaction with data via the network 1816.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1812 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1800 may comprise a physical or logical connection established between a remote microprocessor and a mainframe host computer for the express purpose of uploading, downloading, or viewing interactive data and databases on-line in real time. The remote microprocessor may be operated by an entity operating the computer system 1800, including the client server systems or the main server system, an/or may be operated by one or more of the data sources 1819 and/or one or more of the computing systems. In some embodiments, terminal emulation software may be used on the microprocessor for participating in the micro-mainframe link.

In some embodiments, computing systems 1817 that are internal to an entity operating the computer system 1800 may access the image analysis system 1806 internally as an application or process run by the CPU 1802.

User Access Point

In an embodiment, a user access point or user interface 1812 comprises a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

Other Systems

In addition to the systems that are illustrated in FIG. 18, the network 1816 may communicate with other data sources or other computing devices. The computing system 1800 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a signal database, object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A computed axial tomography scan normalization system comprising:
   an acquisition interface configured to access from an electronic database computed axial tomography data of a head region of a patient, the computed axial tomography data comprising a volumetric data set of the head region;
   a skull segmentation filter configured to identify a skull region in the volumetric data set and an intracranial region in the volumetric data set;
   an atlas alignment engine configured to access from an atlas database a normative data set based on a computed axial tomography scanner type;
   a registration generator configured to apply an image registration algorithm to generate alignment data, and to align the volumetric data set to the normative data set to generate an aligned volumetric data set using the alignment data;
   a ventricle segmentation filter configured to identify anterior and posterior portions of ventricular regions of the patient in the aligned volumetric data set;
   a reslicing generator configured to reslice the aligned volumetric data set to generate a normalized volumetric data set; and
   an output interface configured to output the alignment data to a picture archiving and communication system or to output the normalized volumetric data set and a visualization corresponding to the anterior and posterior ventricular regions of the patient,
   wherein the computed axial tomography scan normalization system comprises a computer processor and electronic storage medium.

2. The computed axial tomography scan normalization system of claim 1, further comprising an image alignment assessment generator configured to analyze the normalized volumetric data set to generate an alignment score.

3. The computed axial tomography scan normalization system of claim 2, the output interface configured to store the normalized volumetric data in a database based on determining that the alignment score is above a threshold.

4. The computed axial tomography scan normalization system of claim 1, further comprising a image processing filter configured to apply an image filter to the normalized volumetric data set.

5. The computed axial tomography scan normalization system of claim 1, wherein the normative data set used to align the volumetric data set is selected based on a modality scanner type used to generate the computed axial tomography data of the patient.

6. The computed axial tomography scan normalization system of claim 1, further comprising a data analysis module configured to compute a ventricle shift score, wherein computing the ventricle shift score comprises analyzing anterior portions of lateral ventricular regions of the patient to determine a shift in a patient midline of the anterior portions of the lateral ventricular regions compared with a midline of normalized atlas data, and wherein the output interface is further configured to output the ventricle shift score.

7. The computed axial tomography scan normalization system of claim 1, further comprising a ventricular analysis module configured to:
   determine a number of voxels of the volumetric data set that are identified as lateral ventricle regions of the patient, the lateral ventricle regions comprising the right lateral ventricle region and the left lateral ventricle region; and compute a whole lateral ventricular volume from the number of voxels, and wherein the output interface is further configured to output the whole lateral ventricular volume.

8. The computed axial tomography scan normalization system of claim 1, further comprising a data analysis module configured to compute a statistical measure based on at least some of the volumetric data set and a second normative data set, wherein computing the statistical measure of the at least some of the volumetric data set and the second normative data set comprises:
   determining a number of voxels of each density in at least a portion of the head region of the patient with density values within a predetermined range;
   computing a histogram from the number of voxels of each density; and
   computing a first statistical measure from the histogram from a volume of the second normative data set, wherein the output interface is further configured to output a comparison of the first statistical measure with a prior measurement of the patient.

9. A computed axial tomography scan normalization system comprising:
   an acquisition interface configured to access from an electronic database computed axial tomography data of a head region of a patient, the computed axial tomography data comprising a volumetric data set of the head region;
   a skull segmentation filter configured to identify a skull region in the volumetric data set and an intracranial region in the volumetric data set;
   an atlas alignment engine configured to access from an atlas database a normative data set based on a computed axial tomography scanner type;
   a registration generator configured to apply an image registration algorithm to align the volumetric data set to the normative data set to generate an aligned volumetric data set;
   a reslicing generator configured to reslice the aligned volumetric data set to generate a normalized volumetric data set;
   a data analysis module configured to compute a statistical measure based on at least some of the volumetric data set and a second normative data set; and
   an output interface configured to output the normalized volumetric data set and the statistical measure,
   wherein the computed axial tomography scan normalization system comprises a computer processor and electronic storage medium.

10. The computed axial tomography scan normalization system of claim 9, further comprising:
   a ventricle segmentation filter configured to identify anterior and posterior portions of lateral ventricular regions of the patient in the aligned volumetric data set; and
   a ventricular analysis module configured to compute a ventricle shift score, wherein computing the ventricle shift score comprises analyzing the anterior portions of the lateral ventricular regions to determine a shift in a patient midline of the anterior portions of the lateral ventricular regions compared with a midline of normalized atlas data, and wherein the output interface is further configured to output the ventricle shift score.

11. The computed axial tomography scan normalization system of claim 9, further comprising a ventricular analysis module configured to compute a score from a comparison of voxels in a left lateral ventricle region of the patient to voxels in a right lateral ventricle region of the patient, and wherein the output interface is further configured to output the score.

12. The computed axial tomography scan normalization system of claim 9, further comprising a ventricular analysis module configured to:
   determine a number of voxels of the volumetric data set that are identified as lateral ventricle regions of the patient, the lateral ventricle regions comprising the right lateral ventricle region and the left lateral ventricle region; and
   compute a whole lateral ventricular volume from the number of voxels, and wherein the output interface is further configured to output the whole lateral ventricular volume.

13. The computed axial tomography scan normalization system of claim 9, further comprising a histogram module configured to generate one or more histograms of a whole brain region in the volumetric data set.

14. The computed axial tomography scan normalization system of claim 9, further comprising a data analysis module configured to select the second normative data set from a normative database, wherein the data analysis module selects the second normative data set from the normative database based at least on one of: an age of the patient, a gender of the patient, a modality scanner type used to generate the computed axial tomography data of the patient, or a manufacturer of the modality scanner type.

15. The computed axial tomography scan normalization system of claim 9, wherein computing the statistical measure of the at least some of the volumetric data set and the second normative data set comprises:
   determining a number of voxels of the volumetric data set that are identified as a whole intracranial space of the patient;
   computing a whole intracranial volume from the number of voxels; and
   computing a whole intracranial statistical measure of the whole intracranial volume from a volume of the second normative data set.

16. The computed axial tomography scan normalization system of claim 9, wherein computing the statistical measure of the at least some of the volumetric data set and the second normative data set comprises:
   determining a number of voxels of each density in a whole intracranial space of the patient with density values within a predetermined range;
   computing a whole intracranial histogram from the number of voxels of each density; and
   computing a whole intracranial statistical measure from the whole intracranial histogram from a volume of the second normative data set, wherein the output interface is further configured to output a comparison of the whole intracranial statistical measure with a prior measurement of the patient.

17. The computed axial tomography scan normalization system of claim 9, wherein computing the statistical measure of the at least some of the volumetric data set and the second normative data set comprises:
   determining a number of voxels of each density in at least a portion of the head region of the patient with density values within a predetermined range;
   computing a histogram from the number of voxels of each density; and
   computing a first statistical measure from the histogram from a volume of the second normative data set, wherein the output interface is further configured to output a comparison of the first statistical measure with a prior measurement of the patient.

18. The computed axial tomography scan normalization system of claim 9, wherein the statistical measure comprises at least one of: a mean, a standard deviation, or a Z score.

19. A computed axial tomography scan normalization system comprising:
an acquisition interface configured to access from an electronic database computed axial tomography data of a head region of a patient, the computed axial tomography data comprising a volumetric data set of the head region;
a skull segmentation filter configured to identify a skull region in the volumetric data set and an intracranial region in the volumetric data set;
an atlas alignment engine configured to access from an atlas database a normative data set based on a computed axial tomography scanner type;
a registration generator configured to apply an image registration algorithm to align the volumetric data set to the normative data set to generate an aligned volumetric data set;
a reslicing generator configured to reslice the aligned volumetric data set to generate a normalized volumetric data set; and
an output interface configured to output the normalized volumetric data set,
wherein the computed axial tomography scan normalization system comprises a computer processor and electronic storage medium.

20. The computed axial tomography scan normalization system of claim 19, further comprising:
a ventricle segmentation filter configured to identify anterior portions of lateral ventricular regions of the patient in the aligned volumetric data set; and
a ventricular analysis module configured to compute a ventricle shift score, wherein computing the ventricle shift score comprises analyzing the anterior portions of the lateral ventricular regions to determine a shift in a patient midline of the anterior portions of the lateral ventricular regions compared with a midline of normalized atlas data, and wherein the output interface is further configured to output the ventricle shift score.

21. The computed axial tomography scan normalization system of claim 19, further comprising a ventricular analysis module configured to compute a score from a comparison of voxels in a left lateral ventricle region of the patient to voxels in a right lateral ventricle region of the patient, and wherein the output interface is further configured to output the score.

22. The computed axial tomography scan normalization system of claim 19, further comprising a ventricular analysis module configured to:
determine a number of voxels of the volumetric data set that are identified as lateral ventricle regions of the patient, the lateral ventricle regions comprising the right lateral ventricle region and the left lateral ventricle region; and
compute a whole lateral ventricular volume from the number of voxels, and wherein the output interface is further configured to output the whole lateral ventricular volume.

23. The computed axial tomography scan normalization system of claim 19, further comprising a data analysis module configured to compute a statistical measure of at least some of the volumetric data set and a second normative data set, and wherein the output interface is further configured to output the statistical measure.

24. The computed axial tomography scan normalization system of claim 23, wherein the data analysis module is further configured to select the second normative data set from a normative database, wherein the data analysis module selects the second normative data set from the normative database based on at least one of: an age of the patient, a gender of the patient, a modality scanner type used to generate the computed axial tomography data of the patient, or a manufacturer of the modality scanner type.

25. The computed axial tomography scan normalization system of claim 23, wherein computing the statistical measure of the at least some of the volumetric data set and the second normative data set comprises:
determining a number of voxels of the volumetric data set that are identified as a whole intracranial space of the patient;
computing a whole intracranial volume from the number of voxels; and
computing a whole intracranial statistical measure of the whole intracranial volume from a volume of the second normative data set.

26. The computed axial tomography scan normalization system of claim 23, wherein computing the statistical measure of the at least some of the volumetric data set and the second normative data set comprises:
determining a number of voxels of each density in a whole intracranial space of the patient with density values within a predetermined range;
computing a whole intracranial histogram from the number of voxels of each density; and
computing a whole intracranial statistical measure from the whole intracranial histogram from a volume of the second normative data set, wherein the output interface is further configured to output a comparison of the whole intracranial statistical measure with a prior measurement of the patient.

27. The computed axial tomography scan normalization system of claim 23, wherein computing the statistical measure of the at least some of the volumetric data set and the second normative data set comprises:
determining a number of voxels of each density in at least a portion of the head region of the patient with density values within a predetermined range;
computing a histogram from the number of voxels of each density; and
computing a first statistical measure from the histogram from a volume of the second normative data set, wherein the output interface is further configured to output a comparison of the first statistical measure with a prior measurement of the patient.

28. The computed axial tomography scan normalization system of claim 23, wherein the statistical measure comprises at least one of: a mean, a standard deviation, or a Z score.

29. A computed axial tomography scan normalization system comprising:
an acquisition interface configured to access from an electronic database computed axial tomography data of a head region of a patient, the computed axial tomography data comprising a volumetric data set of the head region;
an atlas alignment engine configured to access from an atlas database a normative data set based on a computed axial tomography scanner type;
an image filter configured to apply a smoothness algorithm to at least a portion of the computed axial tomography data to generate smoothed computed axial tomography data;
a registration generator configured to apply an image registration algorithm to use the smoothed computed axial tomography data and align the volumetric data set to the normative data set to generate an aligned volumetric data set;

a reslicing generator configured to reslice the aligned volumetric data set to generate a normalized volumetric data set; and an output interface configured to output the normalized volumetric data set, wherein the computed axial tomography scan normalization system comprises a computer processor and electronic storage medium.

30. The computed axial tomography scan normalization system of claim 29, further comprising:

a ventricle segmentation filter configured to identify anterior portions of lateral ventricular regions of the patient in the aligned volumetric data set; and a ventricular analysis module configured to compute a ventricle shift score, wherein computing the ventricle shift score comprises analyzing the anterior portions of the lateral ventricular regions to determine a shift in a patient midline of the anterior portions of the lateral ventricular regions compared with a midline of normalized atlas data, and wherein the output interface is further configured to output the ventricle shift score.

31. The computed axial tomography scan normalization system of claim 29, further comprising a ventricular analysis module configured to compute a score from a comparison of voxels in a left lateral ventricle region of the patient to voxels in a right lateral ventricle region of the patient, and wherein the output interface is further configured to output the score.

32. The computed axial tomography scan normalization system of claim 29, further comprising a ventricular analysis module configured to:

determine a number of voxels of the volumetric data set that are identified as lateral ventricle regions of the patient, the lateral ventricle regions comprising the right lateral ventricle region and the left lateral ventricle region; and compute a whole lateral ventricular volume from the number of voxels, and wherein the output interface is further configured to output the whole lateral ventricular volume.

33. The computed axial tomography scan normalization system of claim 29, further comprising a data analysis module configured to compute a statistical measure of at least some of the volumetric data set and a second normative data set, and wherein the output interface is further configured to output the statistical measure.

34. The computed axial tomography scan normalization system of claim 33, wherein the data analysis module is further configured to select the second normative data set from a normative database, wherein the data analysis module selects the second normative data set from the normative database based on at least one of: an age of the patient, a gender of the patient, a modality scanner type used to generate the computed axial tomography data of the patient, or a manufacturer of the modality scanner type.

35. The computed axial tomography scan normalization system of claim 33, wherein computing the statistical measure of the at least some of the volumetric data set and the second normative data set comprises:

determining a number of voxels of the volumetric data set that are identified as a whole intracranial space of the patient;

computing a whole intracranial volume from the number of voxels; and computing a whole intracranial statistical measure of the whole intracranial volume from a volume of the second normative data set.

36. The computed axial tomography scan normalization system of claim 33, wherein computing the statistical measure of the at least some of the volumetric data set and the second normative data set comprises:

determining a number of voxels of each density in a whole intracranial space of the patient with density values within a predetermined range;

computing a whole intracranial histogram from the number of voxels of each density; and computing a whole intracranial statistical measure from the whole intracranial histogram from a volume of the second normative data set, wherein the output interface is further configured to output a comparison of the whole intracranial statistical measure with a prior measurement of the patient.

37. The computed axial tomography scan normalization system of claim 33, wherein computing the statistical measure of the at least some of the volumetric data set and the second normative data set comprises:

determining a number of voxels of each density in at least a portion of the head region of the patient with density values within a predetermined range;

computing a histogram from the number of voxels of each density; and computing a first statistical measure from the histogram from a volume of the second normative data set, wherein the output interface is further configured to output a comparison of the first statistical measure with a prior measurement of the patient.

38. The computed axial tomography scan normalization system of claim 33, wherein the statistical measure comprises at least one of: a mean, a standard deviation, or a Z score.

* * * * *